(12) United States Patent
Oleson et al.

(10) Patent No.: US 10,958,829 B2
(45) Date of Patent: *Mar. 23, 2021

(54) CAPTURING DIGITAL IMAGES THAT ALIGN WITH A TARGET IMAGE MODEL

(71) Applicant: Adobe Inc., San Jose, CA (US)

(72) Inventors: Alannah Oleson, Corvallis, OR (US); Radomir Mech, Mountain View, CA (US); Jose Echevarria, San Jose, CA (US); Jingwan Lu, Santa Clara, CA (US)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,976

(22) Filed: Jan. 15, 2020

(65) Prior Publication Data
US 2020/0154037 A1 May 14, 2020

Related U.S. Application Data

(63) Continuation of application No. 15/897,951, filed on Feb. 15, 2018, now Pat. No. 10,574,881.

(51) Int. Cl.
*H04N 5/232* (2006.01)
*G06T 7/73* (2017.01)
(Continued)

(52) U.S. Cl.
CPC .......... *H04N 5/23222* (2013.01); *G06T 7/75* (2017.01); *H04N 5/23216* (2013.01); *H04N 5/272* (2013.01); *G06T 17/20* (2013.01)

(58) Field of Classification Search
CPC .......... H04N 5/23222; H04N 5/23219; H04N 5/23245; H04N 5/23293; H04N 5/23216;
(Continued)

(56) References Cited

U.S. PATENT DOCUMENTS 4,730,260 A * 3/1988 Mori .................... G02C 13/003
345/632
9,058,765 B1 6/2015 Mallick et al.
(Continued)

FOREIGN PATENT DOCUMENTS

EP 2 275 864 A1 1/2011

OTHER PUBLICATIONS

Jason M. Saragih, Simon Lucey, and Jeffrey F. Cohn, Deformable model fitting by regularized landmark mean-shift, International Journal of Computer Vision 91.2 200-215 (2011).
(Continued)

*Primary Examiner* — Pritham D Prabhakher
(74) *Attorney, Agent, or Firm* — Keller Jolley Preece

(57) ABSTRACT

The present disclosure includes systems, methods, and non-transitory computer readable media that can guide a user to align a camera feed captured by a user client device with a target digital image. In particular, the systems described herein can analyze a camera feed to determine image attributes for the camera feed. The systems can compare the image attributes of the camera feed with corresponding target image attributes of a target digital image. Additionally, the systems can generate and provide instructions to guide a user to align the image attributes of the camera feed with the target image attributes of the target digital image.

20 Claims, 13 Drawing Sheets

(51) Int. Cl.
*H04N 5/272* (2006.01)
*G06T 17/20* (2006.01)

(58) Field of Classification Search
CPC ........ H04N 5/272; G06K 9/6202; G06T 7/74; G06T 7/75; G06T 2207/30244; G06T 17/20
USPC .......................................................... 348/239
See application file for complete search history.

(56) References Cited

U.S. PATENT DOCUMENTS

| | | | |
|---|---|---|---|
| 9,344,673 | B1 | 5/2016 | Buchheit et al. |
| 9,470,911 | B2* | 10/2016 | Fonte ................... A61B 3/0041 |
| 9,507,420 | B2 | 11/2016 | Tartz et al. |
| 9,848,121 | B2 | 12/2017 | Perez-Feliciano |
| 9,866,767 | B2* | 1/2018 | Jones ..................... H04N 5/272 |
| 9,912,847 | B1 | 3/2018 | Yuan et al. |
| 9,912,861 | B1 | 3/2018 | Solh et al. |
| 9,986,151 | B1 | 5/2018 | Poon et al. |
| 10,075,631 | B2 | 9/2018 | Iijima et al. |
| 10,091,414 | B2 | 10/2018 | Chan et al. |
| 10,165,199 | B2* | 12/2018 | Zhang ..................... H04N 5/265 |
| 10,255,482 | B2 | 4/2019 | Morgana et al. |
| 10,255,484 | B2* | 4/2019 | Maltz ................... A61B 5/6898 |
| 2013/0038759 | A1 | 2/2013 | Jo et al. |
| 2013/0162862 | A1 | 6/2013 | Zhao et al. |
| 2014/0247325 | A1 | 9/2014 | Wu et al. |
| 2014/0313334 | A1 | 10/2014 | Slotky |
| 2015/0055085 | A1* | 2/2015 | Fonte ................... H04L 65/403 351/178 |
| 2015/0264255 | A1 | 9/2015 | Budihal |
| 2015/0271394 | A1 | 9/2015 | Iijima et al. |
| 2015/0334292 | A1 | 11/2015 | Tartz et al. |
| 2015/0365600 | A1* | 12/2015 | Pollack .............. H04N 5/23222 348/239 |
| 2016/0105604 | A1 | 4/2016 | Perez-Feliciano et al. |
| 2016/0227133 | A1* | 8/2016 | Jones ..................... H04N 5/272 |
| 2016/0284123 | A1* | 9/2016 | Hare ........................ G06T 7/55 |
| 2017/0017834 | A1 | 1/2017 | Sabitov et al. |
| 2017/0061210 | A1 | 3/2017 | Ollila |
| 2017/0111574 | A1* | 4/2017 | Miyashita ........ H04N 5/232945 |
| 2017/0221244 | A1 | 8/2017 | Hiraga et al. |
| 2017/0270348 | A1 | 9/2017 | Morgana et al. |
| 2017/0270349 | A1* | 9/2017 | Polania Cabrera ...... G06K 9/00 |
| 2017/0270350 | A1* | 9/2017 | Maltz ..................... G16H 40/67 |
| 2017/0374280 | A1 | 12/2017 | Chan et al. |
| 2018/0247112 | A1* | 8/2018 | Norimatsu ......... G06K 9/00671 |
| 2018/0307310 | A1 | 10/2018 | McCombe et al. |
| 2019/0096112 | A1 | 3/2019 | Pao et al. |

OTHER PUBLICATIONS

Justus Thies, Michael Zollhofer, Marc Stamminger, Christian Theobalt, and Matthias Nießner, Face2face: Real-time face capture and reenactment of rgb videos, Proceedings of the IEEE Conference on Computer Vision and Pattern Recognition, 2387-2395 (2016).

Roy Or-El, Guy Rosman, Aaron Wetzler, Ron Kimmel, and Alfred M. Bruckstein, RGBD-fusion: Real-time high precision depth recovery, Proceedings of the IEEE Conference on Computer Vision and Pattern, Recognition, 5407-5416 (2015).

Qifan Li and Daniel Vogel. 2017. Guided Selfies using Models of Portrait Aesthetics. In Proceedings of the 2017 Conference on Designing Interactive Systems (DIS '17). ACM, New York, NY, USA, 179-190. DOI: https://doi.org/10.1145/3064663.3064700.

Combined Search and Examination Report as received in United Kingdom Application GB1816794.0 dated Apr. 10, 2019.

U.S. Appl. No. 15/897,951, filed Jul. 9, 2019, Office Action.

U.S. Appl. No. 15/897,951, filed Oct. 16, 2019, Notice of Allowance.

* cited by examiner

CAPTURING DIGITAL IMAGES THAT ALIGN WITH A TARGET IMAGE MODEL

CROSS-REFERENCE TO RELATED APPLICATIONS

The present application is a continuation of U.S. application Ser. No. 15/897,951, filed on Feb. 15, 2018. The aforementioned application is hereby incorporated by reference in its entirety.

BACKGROUND

With advances in camera technology and the rise of camera-enabled mobile devices, users are capturing more digital images than ever. The vast majority of users have little or no training in professional photography, and as a result, many digital images are poor in quality. For example, many digital images have bad lighting or improper camera angles that result in images that are unclear or that are otherwise aesthetically unappealing. Accordingly, many camera-enabled mobile devices provide applications that analyze and modify digital images, post capture, to improve the visual aesthetics of the images. For example, conventional systems utilize image filters or other imaging tools to alter brightness, contrast, colors, or other image attributes in a post hoc manner. While these conventional systems can modify digital images to improve the overall quality of the images, these systems nonetheless suffer from a number of disadvantages.

For example, while conventional processes and systems can modify digital images to an extent, these systems nonetheless produce digital images that are lower in quality than professional photographs. Indeed, because these conventional systems can only improve digital images based on the underlying originally-captured images, resulting modified images are often still low-quality.

In addition, conventional systems typically require a relatively large amount of processing power. In particular, conventional systems typically require processing time after capturing a digital image to analyze and modify a digital image. For example, conventional systems may require a relatively large amount of computational resources, and thus, not be available on various types of mobile devices with relatively limited computational resources. Additionally, the storage of original and modified images can use large of amounts of storage space, particularly when a user takes many photos in an effort to capture a higher quality image.

Thus, there are disadvantages with regard to conventional digital image modification systems.

SUMMARY

This disclosure describes one or more embodiments of methods, non-transitory computer readable media, and systems that solve the foregoing problems in addition to providing other benefits. While this summary refers to systems for simplicity, the summary also applies to certain disclosed methods and non-transitory computer readable media. To solve the foregoing and other problems, the disclosed systems analyze a camera feed associated with a camera of a user client device (e.g., a smartphone). The systems further determine image attributes associated with the camera feed and compare those image attributes with corresponding image attributes of a target or template image. Based on the comparison, the systems provide a guide to instruct the user of the user client device to manipulate the camera or themselves to improve an image to be captured. For example, the systems described herein provide real-time (or near real-time) recommendations to adjust one or more of lighting conditions, camera angles, positioning of objects to be captured, etc. Thus, one or more embodiments aid a user in capturing a high-quality image that mimics a target or template image. By guiding the user to capture a digital image that matches one or more characteristics of a target or template image, the systems described herein reduce the likelihood of capturing (and the overall number of) poor quality digital images and educate the user on how to capture high quality digital images in the future.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
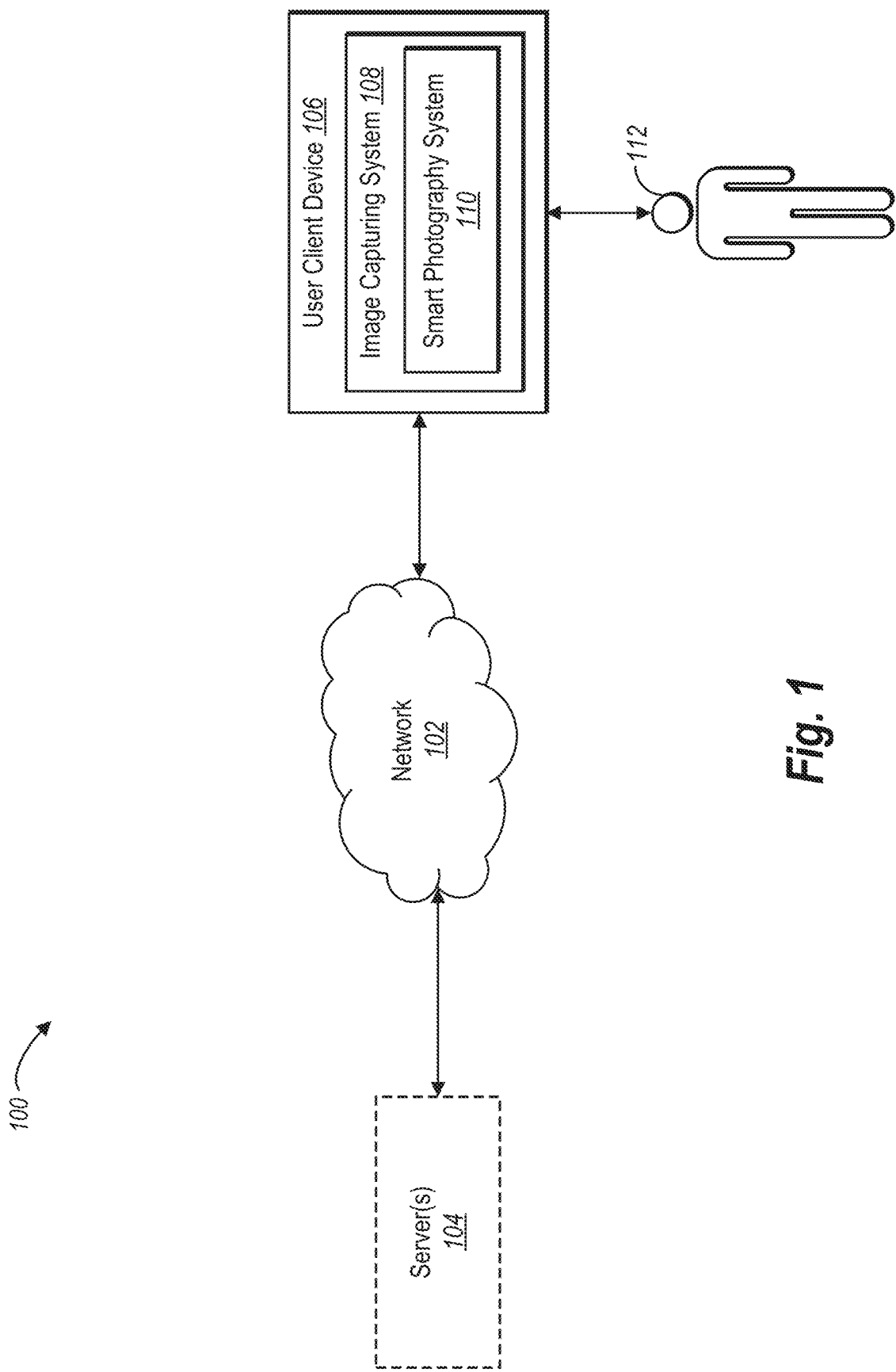
FIG. 1 illustrates a schematic diagram of an example environment in which a smart photography system can operate in accordance with one or more embodiments.

One or more embodiments described herein provide benefits and solve one or more of the foregoing or other problems in the art with a smart photography system that guides a user to align one or more image attributes of a camera feed with one or more image attributes of a target image or target image model. In particular, the smart photography system described herein analyzes a camera feed of a user client device and compares image attributes of the camera feed with image attributes of a target image or target image model. Based on the comparison, the smart photography system generates instructions for adjustments that a user can make to help align the camera feed with the target image or target image model.

To guide a user to capture a digital image that matches a target image or target image model, the smart photography system displays, by way of a user client device, a user interface that includes a live (e.g., contemporaneous) camera feed. The smart photography system analyzes the camera feed in real time to determine image attributes associated with the camera feed. Based on those image attributes, the smart photography system compares the image attributes of the camera feed with predefined (e.g., predetermined) image attributes of the target image or target image model. Based on the comparison, the smart photography system determines, in real time, changes that the user can make to adjust the camera feed to have image attributes that are within a tolerance of the image attributes associated with the target image or target image model. As the camera feed changes in response to adjustments made by the user, the smart photography system can update the analysis of the image attributes and suggested adjustments. Accordingly, the smart photography system generates and provides a guide to instruct the user on steps to align the image attributes of the camera feed with the image attributes of the target image or target image model.

As mentioned, the smart photography system provides a guide to help a user capture an image similar to a target image or target image model. For example, the smart photography system displays a number of target image models that the user may desire to mimic in a photograph. A target image model can comprise an analysis or indication of one or more target image attributes. In one or more embodiments, the smart photography can receive a selection of a target image (e.g., another photograph) that the user desires to mimic. The smart photography system can then generate a target image model from the target image.

In response to a user selection of a target image model, the smart photography system displays a target attribute overlay on the camera interface that indicates areas including the target image attribute(s) from the target image model—which are therefore areas that the user also wants to include the target image attribute(s) in the camera feed. As the user moves the camera (e.g., the user device), the smart photography system continuously updates the target attribute overlay to display changes in the target image attributes (e.g., lighting, shading, position of objects) within the camera feed in real time or near real time.

Additionally, the smart photography system determines image attributes associated with the camera feed. More specifically, based on generating a three-dimensional mesh, the smart photography system determines image attributes such as object position, object orientation (e.g., direction and tilt), and a direction of the light source(s) that illuminate the camera feed. The smart photography system also displays an image attribute overlay on the camera interface that indicates areas of the camera feed including the image attribute(s). Thus, the smart photography system can render attribute overlays together that both illustrate target image attributes and current image attributes.

The smart photography system then compares the camera feed with a selected target image model. In particular, the smart photography system compares the image attributes of the camera feed with the known, predefined target image attributes of the selected target image model. Based on the comparison between the camera feed and the target image model, the smart photography system generates a guide to align the camera feed with the target image model. In particular, the smart photography system determines how to correct differences between the image attributes of the camera feed and the target image attributes of the target image model.

Upon determining how to correct the differences between the camera feed and the target image model, the smart photography system provides a guide to the user by way of the user client device. In particular, the smart photography system displays arrows or other indicators to instruct the user to move the camera associated with the user device, objects in the camera feed, and/or the light source. The smart photography system may further provide more detailed text-based instructions.

In response to detecting that the image attributes of the camera feed are within a tolerance (e.g., a similarity threshold) of the target image attributes of the target image model, the smart photography system indicates this to the user. For example, the smart photography system may change the color of the attribute overlays or may display text (e.g., "Success!") on the display screen to indicate to the user that the camera feed aligns with the target image model. In addition to notifying the user that the camera feed matches the target image model, the smart photography system can further automatically capture one or more digital images in response to detecting that the camera feed is aligned with the target image model. In other words, the smart photography system can activate the camera to capture one or more images or capture screen shots of the user interface without user input to capture an image (e.g., without the user selecting a capture button) based on detecting that the image attributes of the camera feed are within a tolerance of the target image attributes.

The smart photography system described herein provides a number of advantages over conventional digital image modification systems. For example, the smart photography system produces higher quality images than conventional systems. In particular, because the smart photography system guides a user to align the camera feed with a target image model, the smart photography system prevents users from capturing poor quality digital images. Many conventional systems, on the other hand, are limited in the quality of images they can produce because editing capabilities can only overcome so many flaws in an originally-captured low-quality image.

In addition, the smart photography system is more computationally efficient than conventional systems. Whereas conventional systems require a significant amount of time, processing power, and other computer resources to edit digital images post-capture, the smart photography system guides a user to align a camera feed with a target image model, thereby eliminating (or greatly reducing) the need for any post-capture modifications. As a result, the smart photography system uses fewer computer resources and less time than conventional systems to produce high-quality images.

As another advantage, the smart photography system is also more immersive than conventional systems. In particular, the smart photography system provides real-time (or near real-time) guidance with visual overlays based on analysis of a camera feed. Many conventional systems, on the other hand, only provide the ability to edit digital images once they are captured, and therefore, do not provide an immersive experience. Thus, the smart photography system provides greater flexibility over conventional post-capture modification systems.

Additional detail regarding the smart photography system is provided below. Throughout the description of the smart photography system, this disclosure will use various terminology to describe the systems, methods, and computer readable media associated with the smart photography system. Accordingly, hereafter is provided a number of definitions of terms that relate to the smart photography system and the disclosure provided herein.

As used herein, the term "digital image" refers to a digital representation of objects captured by a camera device. For example, a digital image may refer to a digital photograph captured using a mobile device with an integrated digital camera. A digital image may also refer to an image stored in a digital database accessible by a user client device and/or a server. Furthermore, a digital image may portray a scene including one or more faces (e.g., a selfie).

As used herein, a "target image model" refers to a model of a digital image with predefined or predetermined image attributes. Indeed, a target image model generally refers to a model or representation of a digital image that a user may try to mimic or that has attributes that a user may try to reproduce in a different digital image. A target image model can refer to a professional digital image with ideal lighting conditions (e.g., light source location), face position, face orientation, and other image attributes. Indeed, a target image model can include known attributes such as a target lighting direction vector, a target face or head position, and a target face or head orientation (e.g., direction and/or tilt).

As mentioned, a user may capture a digital image by way of a user client device. As used herein, the term "user client device" refers to a computing device operable by a user. In particular, a user client device can refer to a computing device capable of capturing and/or storing digital images. A user device can include a camera and can further include a display screen capable of displaying or presenting digital content such as a digital image. For instance, a user client device can include a mobile device such as a smartphone, a tablet, or a wearable device.

As mentioned above, a user client device can present a camera feed by way of a display screen. As used herein, the term "camera feed" refers to a video representation of a scene captured by way of a camera associated with a user client device. A camera feed can refer to a video representation simultaneously captured by way of the camera and displayed on a display screen of the user device. In addition, a camera feed can refer to a scene captured and displayed in real time or near real time.

As further mentioned above, the smart photography system analyzes a camera feed to determine one or more image attributes associated with the camera feed. As used herein, the term "image attributes" refers to features or characteristics of a digital image. For example, image positioning attributes refer positions of objects within the digital image or camera feed (e.g., head or face position, head or face orientation (e.g., direction and tilt), or positions of other objects in a camera feed). Image lighting attributes refer to a location or effect of one or more light sources, and/or shading that results from different light source locations. A light source location can comprise a vector having a magnitude and a direction that indicates a location of a light source.

As will be described in further detail below, image attributes may refer to camera feed attributes and/or to target image attributes (sometimes referred to as target attributes). Camera feed attributes may refer to the digital image attributes associated with the camera feed while target image attributes may refer to the image attributes associated with the target image model.

In one or more embodiments, the smart photography system generates a three-dimensional mesh of a face depicted within the camera feed. As will be described in further detail below with reference to the figures, a "three-dimensional face mesh" refers to a three-dimensional mapping of facial landmarks and contours. In particular, a three-dimensional face mesh can map locations of facial landmarks such as a nose, mouth, eyes, hairline, etc.

As also mentioned, the smart photography system determines whether the image attributes of the camera feed are within a tolerance of the image lighting attributes of the target image model. As used herein, the term "tolerance" refers to a range of acceptable difference between one value and another. A tolerance can refer to a threshold score or a threshold value. For example, a tolerance can include a number of degrees of head or face tilt, a number of pixels of head movement in one direction or another, a percentage of a shaded area in a camera feed as compared to a target shaded area (e.g., the camera feed can have an 80% coverage of the shading in the target image model), or some other value.

More detail regarding the smart photography system will now be provided with reference to the figures. For example, FIG. 1 illustrates a schematic diagram of an example environment 100 for implementing a smart photography system 110 in accordance with one or more embodiments. An overview of the environment 100 is described in relation to FIG. 1. Thereafter, a more detailed description of the components and processes of the smart photography system 110 is provided in relation to the subsequent figures.

As mentioned, FIG. 1 illustrates an exemplary environment 100 including a network 102, server(s) 104, and a user client device 106 associated with a user 112. Each of the components of the environment 100 can communicate with via the network 102. Accordingly, the network 102 can facilitate communications between the server(s) 104 and the user client device 106 via appropriate network protocol. For example, the network 102 may refer to a local network (e.g., a local area network or "LAN"), a wide area network ("WAN"), an Internet communication network, a cellular network, a 3G or 4G network, or else may refer to different communication protocol by which two computing devices can communicate. Example networks are discussed in more detail below with reference to FIG. 8.

As illustrated in FIG. 1, the environment 100 includes a server(s) 104. The server(s) 104 may refer to one or more computing devices that can interface with the user client device 106 and can analyze digital images. In addition, while FIG. 1 illustrates the smart photography system 110 located on the user client device 106, in some embodiments the server(s) 104 include (e.g., implement) part of the entirety of the smart photography system 110. The smart photography system 110 may be implemented by and/or installed on the server(s) 104 as hardware, software, or both. Furthermore, as indicated by the dashed lines, in some embodiments the environment 100 does not include the server(s) 104.

As just mentioned, the environment 100 includes a user client device 106. The user client device 106 is capable of communicating across the network 102 to interface with the other components of the environment 100 to receive and transmit data including digital images, camera feeds (e.g., via streaming), and image lighting attributes. Additionally, the user client device 106 is capable of presenting, via a display, a graphical user interface ("GUI") including a depiction of a camera feed. The user client device 106 is further capable of presenting a GUI that includes a camera feed in addition to a target image model, camera feed shading indicators, and/or target shading indicators.

As illustrated in FIG. 1, the user client device 106 includes an image capturing system 108. As used herein, the term "image capturing system" refers to hardware and/or software that enables a user client device (e.g., user client device 106) to capture, edit, store, share, or otherwise manage digital images. An image capturing system may refer to a webpage, a mobile application, a software program, executable hardware instructions, or a combination thereof. In some embodiments, the image capturing system 108 communicates with the server(s) 104 to upload digital images, download digital images, analyze digital images, and/or synchronize digital images with a user account maintained by server(s) 104. Alternatively, or additionally, the smart photography system 110 can access target image model(s) or target images from the server(s) 104.

As shown, the user client device 106 further includes the smart photography system 110. In particular, the smart photography system 110 may be part of the image capturing system 108 installed as hardware, software, or both. As will be described in further detail below, the smart photography system 110 performs various functions, methods, and processes to guide a user to capture a digital image that matches (e.g., with a tolerance) a target image model.

Although FIG. 1 illustrates a particular arrangement of the environment 100 that includes the server(s) 104, the network 102, the smart photography system 110, and the user client device 106, various additional or alternative arrangements are possible. For example, while FIG. 1 illustrates the user client device 106 including the smart photography system 110, in some embodiments the smart photography system 110 may be located on the server(s) 104 and may communicate with the user client device 106 via network 102.

As mentioned above, in one or more embodiments, the smart photography system 110 analyzes a camera feed captured by a user client device (e.g., user client device 106) to detect image attributes associated with the camera feed. In one or more embodiments, the smart photography system 110 analyzes image attributes of digital images and camera feeds relative to one or more objects. For example, the smart photography system 110 can analyze image attributes relative to a face, head, or other object. The bulk of the description below of the smart photography system 110 is relative to the smart photography system 110 analyzing image attributes relative to a face and providing guidance to help a user capture an image with a face having target image attributes. One will appreciate in light of the disclosure herein that the smart photography system 110 can operate and provide guidance relative to other objects (e.g., inanimate objects, landscapes, animals, multiple faces).

FIGS. 2A-2F illustrate representations of the user client device 106 displaying a user interface 200 that includes a camera feed 202 throughout the process of the smart photography system 110 analyzing the camera feed 202 and guiding the user 112 to align the camera feed 202 with a target image model. The description of FIGS. 2A-2F will provide an overview of the smart photography system 110. Thereafter, a more detailed description of the analysis of the camera feed 202 will be provided in subsequent figures.

Figure 2A:
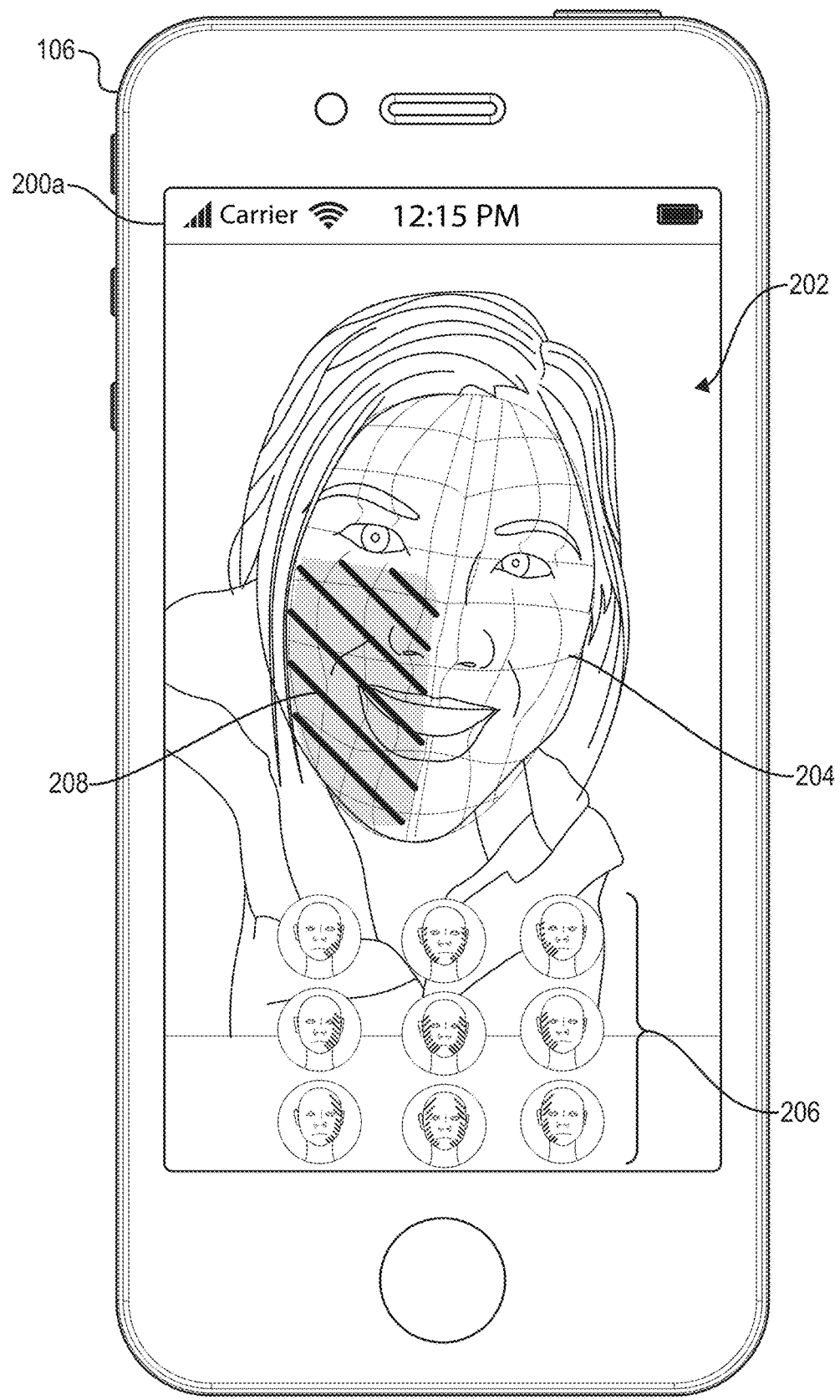
FIGS. 2A-2F illustrate an example user client device displaying example user interfaces of a process of guiding a user to align image attributes of a camera feed with target image attributes in accordance with one or more embodiments.

As illustrated in FIG. 2A, the smart photography system 110 analyzes the camera feed 202 to identify a face depicted within the camera feed 202. In particular, the smart photography system 110 performs facial analysis techniques to identify facial contours and landmarks and fits a face mesh 204 to the face based on the analysis. Additional detail regarding generating the three-dimensional mesh of the face depicted within the camera feed 202 is provided below with reference to FIG. 3. Furthermore, while FIG. 2A illustrates the camera feed 202 including a visual representation of the face mesh 204, in some embodiments, the smart photography system 110 displays the camera feed 202 without a visual representation of the face mesh 204.

The smart photography system 110 further determines or estimates one or more image attributes. For example, the smart photography system 110 performs a light estimation technique to detect one or more light sources that illuminate the camera feed 202 (or objects therein). In one or more embodiments, the smart photography system 110 can generate a three-dimensional map of a face. The smart photography system 110 can determine color values (e.g., RGB, HSV, etc.) of the face pixels within the camera feed 202. The smart photography system 110 further can further compare pixels to determine which are lighter and which are darker. Furthermore, as part of analyzing the camera feed 202, the smart photography system 110 can determine a location of the light source(s) based on comparing the pixels. For example, the smart photography system 110 can generate a lighting vector to represent a location of a light source relative to a face within the camera feed 202. Along similar lines, the smart photography system 110 can generate (or access a previously generated) a target lighting vector that represent a location of a target light source from the target image model. Indeed, based on the analysis of the camera feed 202, the smart photography system 110 can generate a vector to designate the location of a light source (or multiple light sources) that illuminates the camera feed 202 and can determine how to manipulate the camera feed 202 and/or the face within the camera feed 202 to compensate for any differences between the lighting vector and the target lighting vector. Additional detail regarding determining the location of the light source(s) is provided below with reference to FIG. 4.

The smart photography system 110 further determines generates and provides an image attribute overlay 208 in the user interface 202 that represents the determined image attributes of the camera feed 202 in the user interface 200a. For example, utilizing the face mesh 204 and the location of the light source(s), the smart photography system 110 generates a camera feed shading overlay 208 that indicates areas within the camera feed 202 that are shaded (e.g., areas on the face depicted within the camera feed 202 that are shaded). In particular, the smart photography system 110 determines a face position and a face orientation of the face depicted within the camera feed 202 based on the three-dimensional face mesh. Considering the face position and orientation, in conjunction with lighting vectors that indicate the location of light source(s), the smart photography system 110 determines the shaded areas within the camera feed 202. Indeed, as illustrated in FIG. 2A, the camera feed shading overlay 208 indicates that the lower right portion of the face within the camera feed 202 is shaded.

While FIG. 2A illustrates the camera feed shading overlay 208 with a particular lined shading pattern, the smart photography system 110 can provide additional or alternative representations. For example, the smart photography system 110 can provide a camera feed shading overlay 208 can have a different pattern of lines, a different color, or some other appearance to indicate which portions of the camera feed 202 are shaded.

Furthermore, while FIG. 2A illustrates a single attribute overlay (e.g., shading overlay 208), in alternative embodiments, the smart photography system 110 can generate multiple attribute overlays for different image attributes (position, orientation, lighting, occlusion, etc.). Alternatively, the smart photography system 110 can provide a different attribute overlay in place of the shading overlay 208.

As further illustrated in FIG. 2A, the user interface 200a includes a selector gallery 206. In particular, the selector gallery 206 includes a number of target image models which the user 112 can select. Based on the selection of a target image model from the selector gallery 206, the smart photography system 110 guides the user 112 to align the camera feed 202 with the target image model. More specifically, the smart photography system 110 generates a guide to instruct the user 112 to manipulate the camera feed 202 (e.g., by moving the user device 106, the location of a light source, and/or the face depicted in the camera feed 202) so that the image lighting attributes of the camera feed 202 are within a tolerance of the target image lighting attributes of the selected target image model. Additional detail regarding generating the guide and aligning the camera feed 202 with the target image model is provided below in relation to subsequent figures.

Although FIG. 2A illustrates a particular number of selectable target image models within the selector gallery 206, in other embodiments the selector gallery 206 can include more or fewer target image models. In addition, the target image models can be three-dimensional renderings as depicted in FIG. 2A, or the target image models can be digital images (e.g., photographs) that have ideal image attributes. For example, the target image models can be professional photographs that portray a face with ideal shadows, face orientation, face position, etc. As shown, the selector gallery 206 includes nine target image models, each with different image lighting attributes that are illustrated by the different shading lines on each target image model.

The user can select a target image model from the selector gallery 206. In particular, the user 112 may select a target image model 210 (shown in FIG. 2B) from among the number of target image models in the selector gallery 206 of FIG. 2A. For example, the user 112 may tap, touch, click, or otherwise provide user input to select the target image model 210 by way of a touchscreen or other input interface associated with the user client device 106.

Figure 2B:
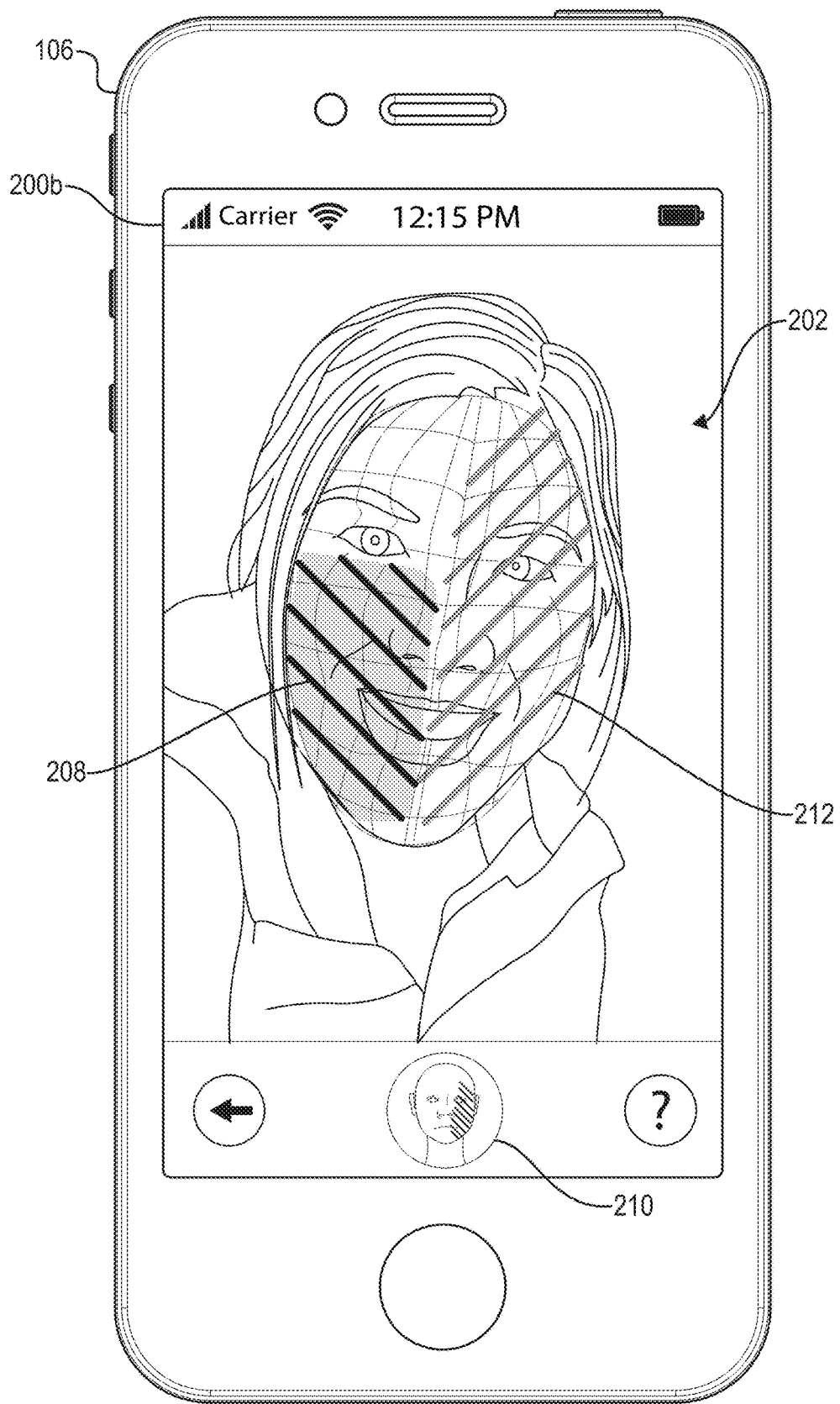

As mentioned above, the smart photography system 110 also generates and provides a target attribute overlay. For example, as illustrated in FIG. 2B, the smart photography system 110 provides a target shading overlay 212. The target shading overlay 212 illustrates how or where the target image attribute would appear on, or relative, to the objects in the camera feed 202. Indeed, as shown, the target shading overlay 212 indicates shading on a portion of the face within the camera feed 202 that corresponds to the shaded portion of the target image model 210.

While FIG. 2B illustrates a particular appearance of the target shading overlay 212, the smart photography system 110 can provide additional or alternative appearances for the target shading overlay 212. For example, the smart photography system 110 can provide the target shading overlay 212 with a different lined pattern, a different color, or some other appearance to indicate which portions of the camera feed 202 are to be shaded to match the target image model 210.

Additionally, the smart photography system 110 can configure a target attribute overlay to have a different appearance than the image attribute overlay. For example, the smart photography system 110 can configure the target and image attribute overlays to provide a visual distinction of how an attribute currently affects, or is portrayed in, a camera feed (e.g., currently shaded portions of the camera feed 202) from where or how attribute would affect the camera feed if positioned or configured as in the target image model 210. For example, FIG. 2B illustrates an embodiment in which the smart photography system 110 configures the shading overlay 208 with one appearance and the target shading overlay 212 with a different appearance.

As mentioned above, to display the shading overlay 208, the smart photography system 110 analyzes the camera feed 202 to determine a camera feed lighting vector that indicates a direction of a light source that illuminates the camera feed 202. Accordingly, as the user 112 moves the user client device 106 (the face within the camera feed 202 and/or the light source that illuminates the camera feed 202), the smart photography system 110 continuously updates the shading overlay 208 in real time or near real time. Thus, the smart photography system 110 can change the location of the shading overlay 208 within the camera feed 202 as the image attributes change in response to movement of the user client device 106, the face within the camera feed 202, and/or the light source.

Similarly, as the user 112 moves the user client device 106 (the face within the camera feed 202 and/or the light source that illuminates the camera feed 202), the smart photography system 110 continuously updates the target shading overlay 212 in real time or near real time. Thus, the smart photography system 110 can change the location of the target shading overlay 212 within the camera feed 202 in response to movement of the user client device 106, the face within the camera feed 202, and/or the light source.

Figure 2C:
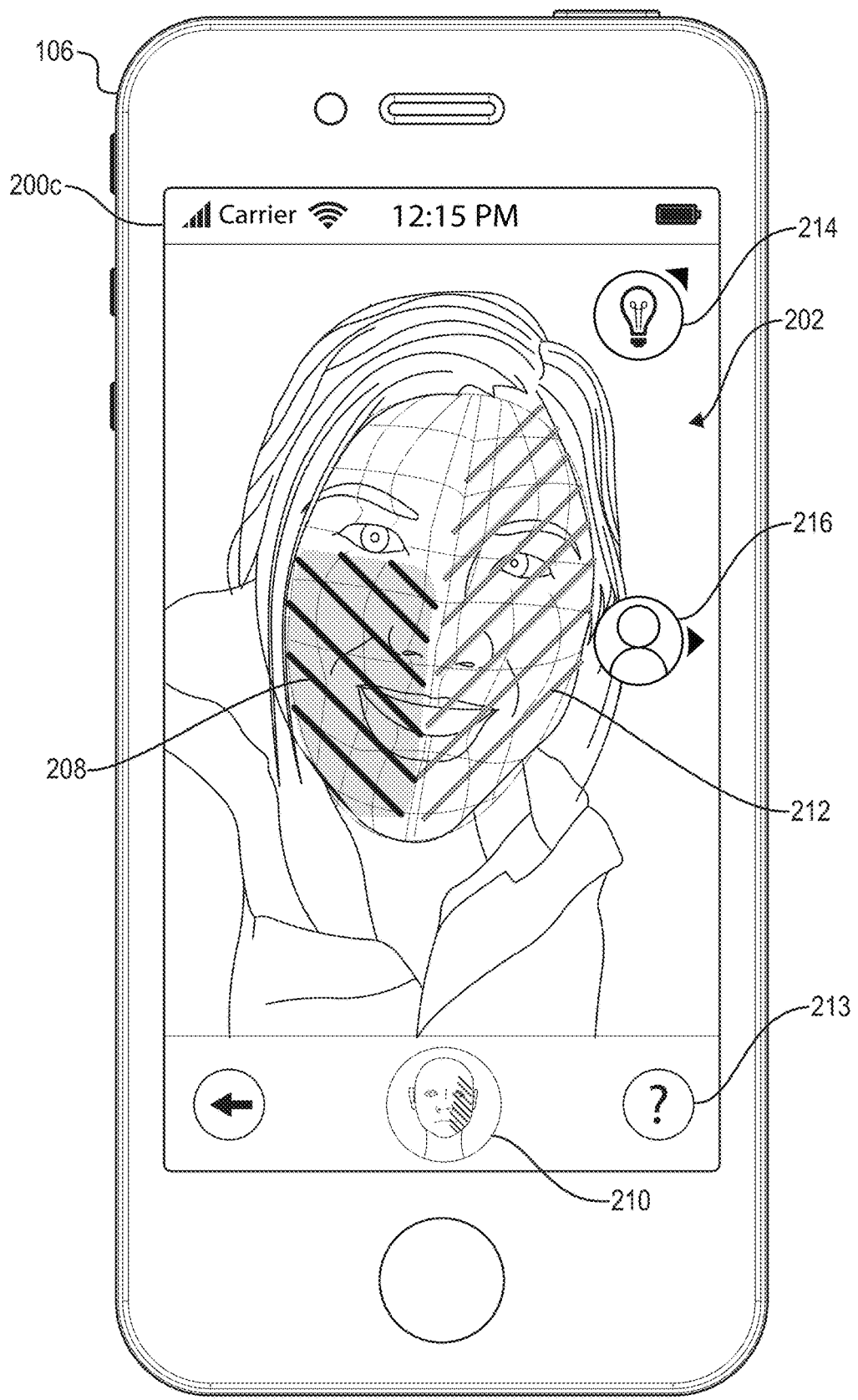

As mentioned previously, the smart photography system 110 can provide guidance on adjustments to make to align the image attributes with the target image attributes. For example, FIG. 2C illustrates that the smart photography system 110 provides a user action button 213. In response to detecting a user interaction with (e.g., a selection of) the user action button 213, the smart photography system 110 displays one or more indicators of actions that the user 112 can perform to align the image attributes of the camera feed 202 with target image attributes of the target image model 210. For example, in response to detecting a user interaction with the user action button 213, the smart photography system 110 displays a lighting direction indicator 214 and a face direction indicator 216. In particular, the lighting direction indicator 214 indicates a direction in which the user 112 can move the light source to align the image lighting features of the camera feed 202 with the target image lighting features of the target image model 210. In other embodiments, the smart photography system 110 displays the lighting direction indicator 214 and the face direction indicator 216 without first requiring a user interaction with the user action button 213.

In addition, the lighting direction indicator 214 is interactive (e.g., selectable). As described in further detail below with reference to FIG. 2E, the user 112 can select the lighting direction indicator 214. In response to receiving the user input to select the lighting direction indicator 214, the smart photography system 110 displays more detailed instructions (e.g., text-based instructions) to guide the user 112 through one or more actions to align the light source location of the camera feed 202 with a light source location of the target image model 210. By aligning the light source locations, the smart photography system 110 further aligns the camera feed shading overlay 208 and the target shading overlay 212.

Additionally, similar to the lighting direction indicator 214, the face direction indicator 216 is also interactive. As described in further detail below with reference to FIG. 2D, the smart photography system 110 detects a user interaction with the face direction indicator 216. In response to detecting the user interaction with the face direction indicator 216, the smart photography system 110 provides more detailed instructions (e.g., text-based instructions) to guide the user 112 through one or more actions to align the face position and/or face orientation of the face depicted in the camera feed 202 with the face position and orientation of the target image model 210. By aligning the face position and orientation, in addition to the light source locations, the smart photography system 110 further aligns the camera feed shading overlay 208 and the target shading overlay 212.

The user interface 200 can further (or alternatively) include a camera direction indicator. In particular, the camera direction indicator can indicate a direction in which the user 112 needs to move the camera and/or the user client device 106 to align the camera feed 202 with the target image model 210. For example, the smart photography system 110 can display a selectable camera direction indicator, and in response to detecting a user interaction with the camera direction indicator, the smart photography system 110 can display more detailed instructions to guide the user through one or more actions to align the camera angle and/or camera position of the camera feed 202 with the target image model 210.

As mentioned, the smart photography system 110 displays a guide to instruct the user 112 to align the camera feed lighting attributes with the target image lighting attributes. The guide can include the lighting direction indicator 214, the face direction indicator 216, the camera direction indicator, and/or detailed (e.g., text-based) instructions. For instance, FIG. 2D illustrates the user client device 106 displaying the user interface 200d that includes the camera feed 202, the face direction indicator 216, and a detailed instruction 218.

Figure 2D:
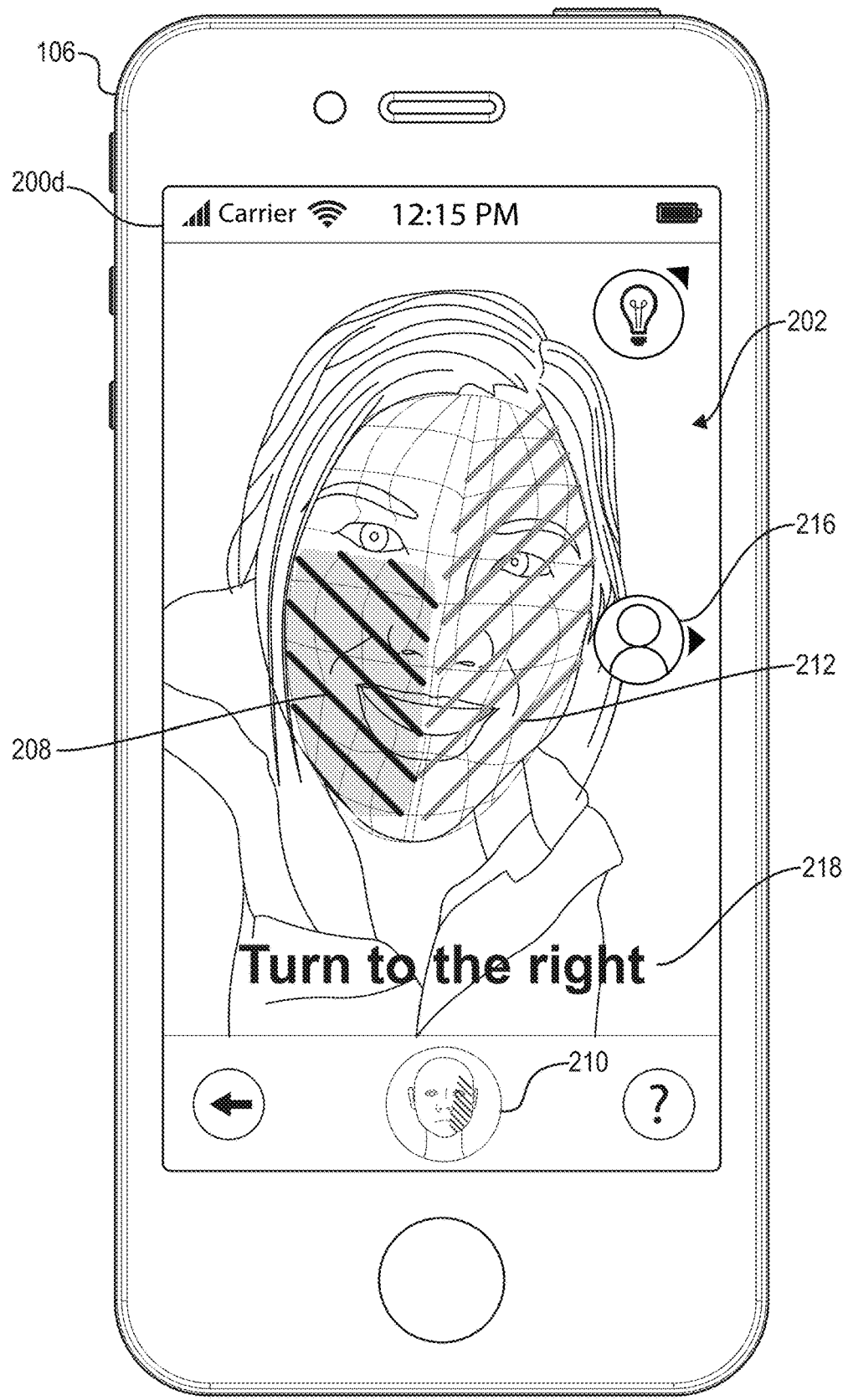

As illustrated in FIG. 2D, the smart photography system 110 detects a user interaction with the face direction indicator 216, whereupon the smart photography system 110 displays the detailed instruction 218, "Turn to the right." Indeed, the smart photography system 110 provides more detailed, text-based instructions to help the user 112 align the camera feed 202 with the target image model 210 so that the camera feed lighting attributes match the target image lighting attributes (e.g., within a tolerance). In particular, the detailed instruction 218 corresponds to the face direction indicator 216. More specifically, the detailed instruction 218 explains in words the instruction provided by the face direction indicator 216. As shown, the detailed instruction 218 instructs the user 112 to "Turn to the right." Thus, the detailed instruction 218 helps the user 112 more clearly understand how to align the camera feed 202 with the target image model 210.

As mentioned above, in some embodiments the smart photography system 110 does not require user interaction with the face direction indicator 216 before providing the detailed instruction 218. In particular, the smart photography system 110 may instead provide the detailed instruction 218 together with the face direction indicator 216 without first detecting a user interaction with the face direction indicator 216.

Additionally, the smart photography system 110 can include additional or alternative text instructions or guidance. For example, the smart photography system 110 can provide instructions to turn in different directions, to move in different directions, to tilt in different directions, etc. Furthermore, the smart photography system 110 can instruct the user 112 to move in varying degrees of intensity or distance. To illustrate, the smart photography system 110 can provide a detailed instruction that instructs the user 112 "Turn slightly to the right," or to "Turn sharply to the right," or to "Tilt your chin up slightly," or to "Tilt your head down a bit," and so on.

In addition to providing varying degrees of detailed instructions, the smart photography system 110 can further update the detailed instruction 218 in real time. For example, as the user 112 moves the user client device 106, the light source, and or the face within the camera feed 202, the smart photography system 110 can periodically update the detailed instruction 218 at regular intervals (e.g., as the smart photography system 110 updates the camera feed shading overlay 208 of FIG. 2C). Thus, as the user 112 turns to the right, the smart photography system 110 may provide updated instructions along the lines of "Keep turning" or "Almost there." Similarly, if the user 112 turns the wrong direction (e.g., to the left), the smart photography system 110 can update the detailed instruction 218 to provide text such as "Turn the other way" or "This works, too! Keep turning."

Figure 2E:
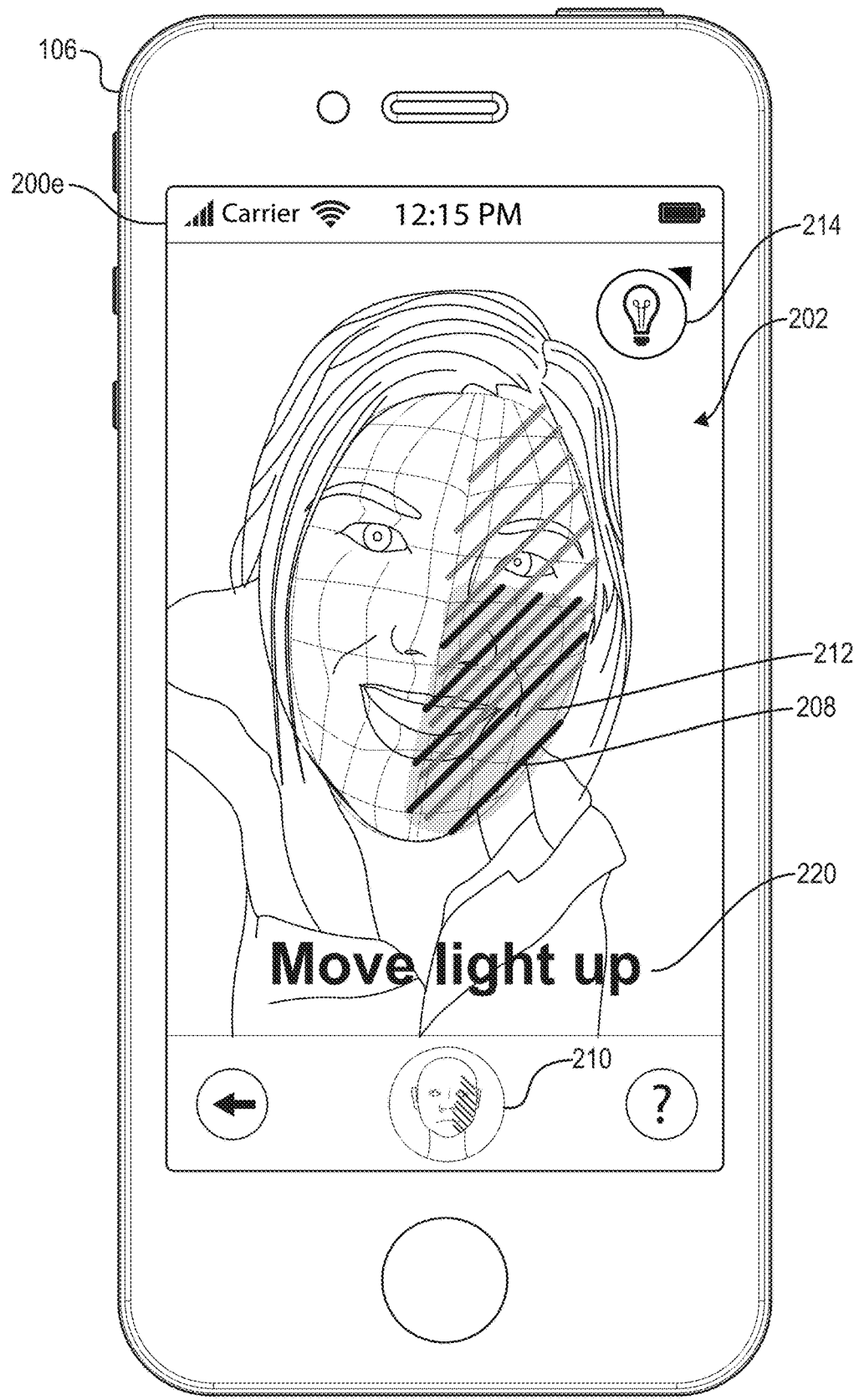

FIG. 2E illustrates the smart photography system 110 providing an additional detailed instruction 220 in response to user adjustments. Similar to the discussion above in relation to the face direction indicator 216, the smart photography system 110 detects a user interaction with the lighting direction indicator 214. In response to the user interaction, the smart photography system 110 displays the detailed instruction 220 in the form of a text overlay on the presentation of the camera feed 202. As shown, the smart photography system 110 provides a detailed instruction 220 that says, "Move light up." Indeed, the smart photography system 110 instructs the user 112 to move the location of the light source in an upward direction to align the camera feed shading overlay 208 with the target shading overlay 212.

As illustrated in FIG. 2E, the camera feed shading overlay 208 is on the same side of the face as the target shading overlay 212. More specifically, as a result of the user 112 following the instructions illustrated in FIG. 2D, the smart photography system 110 displays the camera feed shading overlay 208 in FIG. 2E as more similar to the target shading overlay 212 than in FIG. 2D—i.e., on the same side of the face. As a result of completing the instruction indicated by the face direction indicator 216, the smart photography system 110 removes the face direction indicator 216 from the user interface 200e. In particular, the smart photography system 110 determines that the face within the camera feed 202 is positioned and/or oriented within a certain tolerance (e.g., threshold) of the face within the target image model 210. Based on that determination, the smart photography system 110 removes the face direction indicator 216. In some embodiments, however, the smart photography system 110 does not remove the face direction indicator 216.

However, the camera feed shading overlay 208 of FIG. 2E is still not aligned with the target shading overlay 212. Indeed, as shown in FIG. 2E, the camera feed shading overlay 208 covers only the bottom portion of the face within the camera feed 202, whereas the target shading overlay 212 covers most of the left side of the individual's face. Accordingly, the smart photography system 110 provides the lighting direction indicator 214 to indicate to the user 112 to move the light source that illuminates the camera feed 202 upward. Additionally, as mentioned above, the smart photography system 110 provides the detailed instruction 220 that clarifies or provides more explicit guidance to the user 112. Similar to the discussion above in relation to the face direction indicator 216, the smart photography system 110 may not first detect a user interaction with the lighting direction indicator 214 before displaying the detailed instruction 220.

Although FIGS. 2D and 2E illustrate a particular order of events by which the smart photography system 110 guides the user 112 to align the camera feed 202 with the target image model 210, additional or alternative operations are possible. For example, the processes involved with the description of FIG. 2E may take place before the processes described in relation to FIG. 2D. To illustrate, the smart photography system 110 can detect a user interaction with the lighting direction indicator 214 and thereupon provide the corresponding instructions before detecting a user interaction with the face direction indicator 216.

Additionally, or alternatively, the smart photography system 110 can alternate between providing instructions pertaining to the lighting direction indicator 214 and the face direction indicator 216 (and/or a camera direction indicator) without first requiring that the user 112 complete one instruction before moving to the next. Indeed, the smart photography system 110 can detect slight adjustments in lighting position and face position throughout the process of guiding the user to align the camera feed 202 with the target image model 210, and can update the detailed instructions and/or direction indicators accordingly. Also, the smart photography system 110 can detect a user interaction with the lighting direction indicator 214 before the user 112 has finished the instruction associated with the face direction indicator 216. In these cases, the smart photography system 110 can present the detailed instruction 220 corresponding to the lighting direction indicator 214 while still displaying the face direction indicator 216 to indicate to the user 112 that additional action is required with regards to the face position and/or orientation.

Figure 2F:
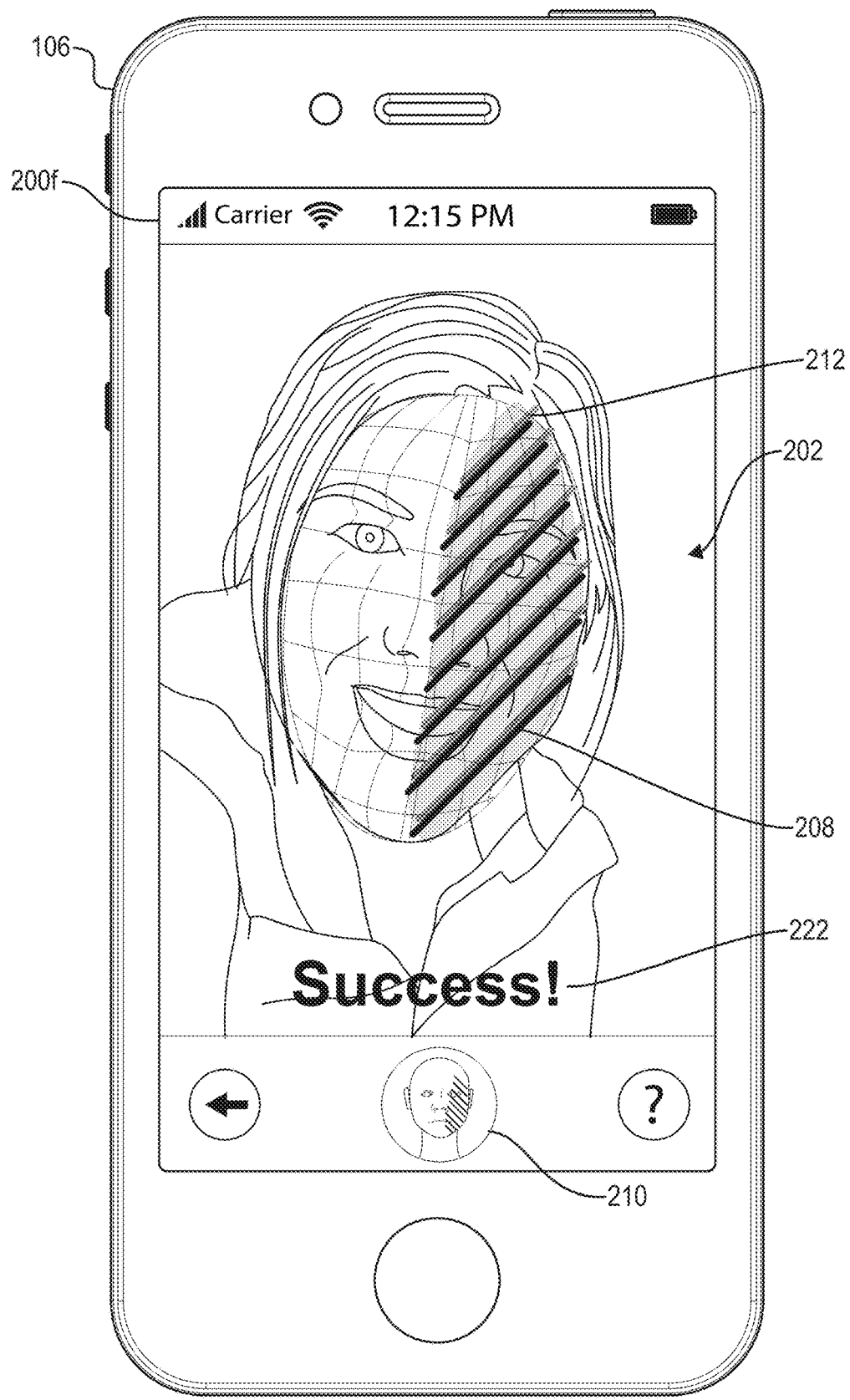

As mentioned, the smart photography system 110 guides the user 112 to align the image attributes of the camera feed 202 with the target image attributes of the target image model 210. For example, FIG. 2F illustrates the user client device 106 displaying a user interface 200f. User interface 200f includes the camera feed 202 and the target image model 210. In addition, user interface 200f further includes the camera feed shading overlay 208 and the target shading overlay 212. As illustrated in FIG. 2F, the camera feed shading overlay 208 nearly matches the target shading overlay 212. Indeed, FIG. 2F illustrates the user interface 200f depicting a situation where the user 112 has adjusted the camera feed 202 by moving the user client device 106, the face within the camera feed 202, and/or the light source to align the lighting attributes of the camera feed 202 with the lighting attributes of the target image model 210.

As shown, the smart photography system 110 removes the lighting direction indicator 214 and the face direction indicator 216 in response to determining that the camera feed lighting attributes are within a tolerance of the target image lighting attributes. Thus, in response to detecting that the face position and/or orientation within the camera feed 202 is within a tolerance of the face position and/or orientation of the target image model 210, the smart photography system 110 removes the face direction indicator 216. Similarly, in response to detecting that the shading within the camera feed 202 is within a tolerance of the shading within the target image model 210, the smart photography system 110 likewise removes the lighting direction indicator 214.

As mentioned above, the smart photography system 110 compares the camera feed lighting attributes with the target image lighting attributes to determine whether the camera feed lighting attributes are within a tolerance of the target image lighting attributes. To compare the lighting attributes in this way, the smart photography system 110 may determine a location and a total area of the target image model 210 that is shaded. The smart photography system 110 may further determine a location and a total area of the face within the camera feed 202 that is shaded. The smart photography system 110 can further determine whether the shaded area of the camera feed 202 is within a threshold area (e.g., a number of square pixels) of the shaded area of the target image model 210. The smart photography system 110 may further determine whether the shaded area within the camera feed 202 is within a threshold distance of the shaded portion of the target image model 210 based on, for example the midpoints of each respective shaded areas.

Upon determining that the image attributes of the camera feed 202 are within a tolerance of the target image attributes of the target image model 210, the smart photography system 110 provides a match indicator 222. In particular, the match indicator 222 indicates to the user 112 that the camera feed 202 matches the target image model 210, at least within an acceptable range of error. As shown, the smart photography system 110 provides a text-based match indicator, "Success!" In some embodiments, however, the smart photography system 110 provides a text-based match indicator with different text. In the same or other embodiments, the smart photography system 110 provides a match indicator by changing the color of the camera feed shading overlay 208 and/or the target shading overlay 212 (e.g., turning them both green). Additionally, or alternatively, the smart photography system 110 changes the color of the target image model 210 (e.g., by highlighting the target image model 210, changing the color of the border of the target image model 210, or by some other way) to indicate to the user 112 that the camera feed 202 matches the target image model 210. The smart photography system 110 can additionally or alternatively provide an audio indicator and/or a haptic (e.g., vibration) indicator as well.

As mentioned above, the smart photography system 110, when dealing with selfies, can generate a three-dimensional mesh of a face depicted within the camera feed 202. In particular, the smart photography system 110 analyzes the camera feed 202 to identify and track various facial landmarks and contours. For instance, the smart photography system 110 utilizes machine learning model techniques to analyze the camera feed 202 and generate the three-dimensional mesh. As used herein, the term "machine learning model" refers to a computational model that can be tuned (e.g., trained) based on inputs to approximate unknown functions. In particular, the term machine-learning model can include a model that uses machine learning algorithms to learn to approximate complex functions and generate outputs based on a plurality of inputs (e.g., a training dataset including a plurality of digital images classified into scene categories). As used herein, a machine-learning model can include, but is not limited to, a neural network (e.g., a convolutional neural network or deep learning), decision tree, association rule learning, inductive logic programming, support vector learning, Bayesian network, regression-based model, principal component analysis, or a combination thereof.

While FIGS. 2A-2F illustrate various functions of the smart photography system 110 in relation to selfies, in some embodiments the smart photography system 110 can similarly operate using the front-facing camera to capture objects other than portraits (e.g., full body images, landscapes). To illustrate, the smart photography system 110 can analyze a camera feed that includes more of an individual than just a face to compare image attributes relative to, for example, a full body shot shown within the camera feed. Indeed, the smart photography system 110 can compare the camera feed with a target image of a body in accordance with the disclosure herein. For example, the smart photography system 110 can compare attributes of the camera feed with target attributes of the target image to provide a guide on how to align lighting, positioning (e.g., positioning of hands or limbs), or other aspects of the camera feed with the target image.

In addition to the foregoing, the smart photography system 110 can operate in a two-person mode where a first user operates a computing device and aims a camera of the computing device at a second user. In particular, the computing device may include more than one camera (e.g., a front camera and a back camera), and the smart photography system 110 may be able to communicate with either or both cameras of the computing device to perform the methods described herein. Indeed, the smart photography system 110 may interface with a front camera when dealing with selfies and may interface with a back camera when dealing with traditional photographs in two-person mode.

Furthermore, in some embodiments the smart photography system 110 can perform the processes and functions described herein in relation to more than a single face within a camera feed. For example, based on the techniques described herein, the smart photography system 110 can analyze multiple faces in a group portrait to provide a guide on how to align each face within the camera feed with a target image model. Alternatively, the smart photography system 110 can provide a guide on how to align the group of faces as a whole with a target image model that also includes an image of a group of images.

In addition, while FIGS. 2A-2F relate to providing a guide on how to align attributes of the camera feed 202 with a target image model 210, in some embodiments the smart photography system 110 can perform these functions automatically. In particular, the smart photography system 110 can interface with a drone or other autonomous system that performs operations or manipulations to adjust the camera feed 202. Accordingly, as the smart photography system 110 analyzes the camera feed 202 to determine how to align the camera feed 202 with the target image 210, the smart photography system 110 can instruct a drone holding (or including) the camera capturing the camera feed 202 to move to achieve alignment with the target image model 210. For example, the smart photography system 110 can instruct the drone to move horizontally, vertically, to tilt, rotate, or to perform a combination thereof to align the camera feed 202 with the target image model 210.

Figure 3:
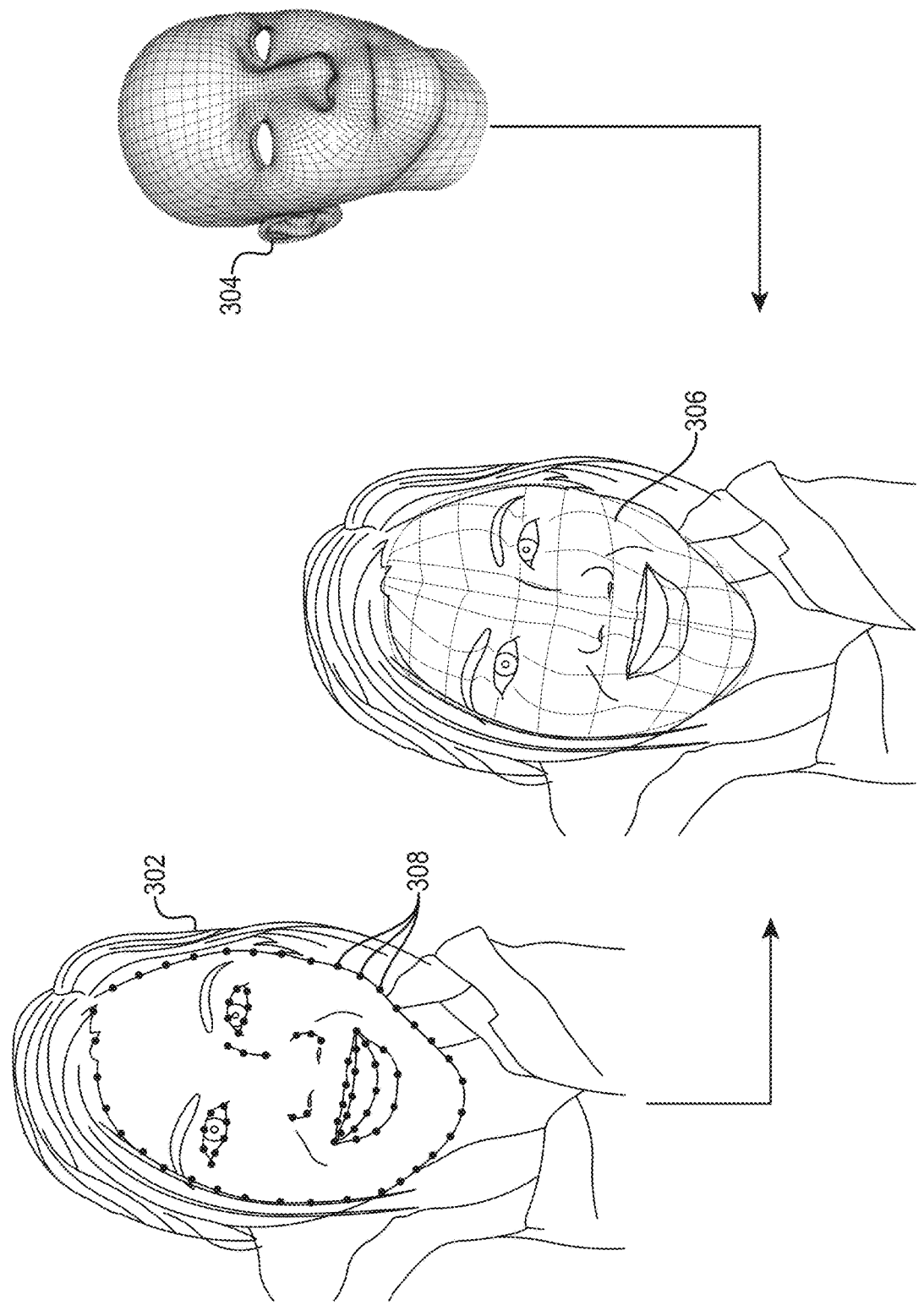
FIG. 3 illustrates an overview of an example process generating a three-dimensional face mesh in accordance with one or more embodiments.

As illustrated in FIG. 3, the smart photography system 110 generates a three-dimensional face mesh 306 based on a morphable model 304. The morphable model 304 is a generic, three-dimensional model of a face that includes a number of vertices (e.g., illustrated by the intersections of gridlines of the morphable model 304) that define various points on the face. Thus, while FIG. 3 illustrates the morphable model 304 including a particular number of vertices, in some embodiments the morphable model can include more or fewer vertices. Additional detail regarding generating the morphable model 304 is provided below.

Additionally, the smart photography system 110 analyzes the face 302 to identify salient points 308 and further aligns the morphable model 304 to the salient points 308. Thus, the smart photography system 110 generates the face mesh 306 to look like the face depicted within the camera feed 202 described above based on the identified salient points 308.

Although FIG. 3 illustrates a simplified face mesh 306 that includes fewer vertices than the morphable model 304, in some embodiments the face mesh 306 can include more or fewer vertices (e.g., the same number of vertices as the morphable model 304).

To generate the face mesh 306 based on the morphable model 304 as well as the salient points 308, the smart photography system 110 implements a multi-linear principal component analysis ("PCA") model. In particular, the first two dimensions of the PCA model represent a facial identity (e.g., geometric shape and skin reflectance) and the third dimension represents the facial expression. Accordingly, the smart photography system 110 can parameterize a given face within the camera feed 202 as:

$$\mathcal{M}_{geo}(\alpha,\delta)=a_{id}+E_{id}*\alpha+E_{exp}*\delta$$

and $$\mathcal{M}_{alb}(\beta)=a_{alb}+E_{alb}*\beta.$$

This parameterization assumes a multivariate normal probability distribution of shape and reflectance around the average shape $a_{id} \in \mathbb{R}^{3n}$ and reflectance $a_{alb} \in \mathbb{R}^{3n}$. The shape $E_{id} \in \mathbb{R}^{3n \times 80}$, reflectance $E_{alb} \in \mathbb{R}^{3n \times 80}$, and expression $E_{exp} \in \mathbb{R}^{3n \times 76}$ basis and the corresponding standard deviations $\sigma_{id} \in \mathbb{R}^{80}$, $\sigma_{alb} \in \mathbb{R}^{80}$, and $\sigma_{exp} \in \mathbb{R}^{76}$ are given. The PCA model has 53,000 vertices and 106,000 faces. In some embodiments, however, the PCA model can include more or fewer vertices and/or faces. The smart photography system 110 generates a synthesized image $\mathcal{C}_S$ by rasterizing the PCA model under a rigid model transformation $\Phi(v)$ and the full perspective transformation $\Pi(v)$.

Given a monocular input sequence, the smart photography system 110 can reconstruct all unknown parameters $\mathcal{P}$ jointly with a robust variational optimization. The proposed object is highly non-linear with regard to the unknown parameters and has the following components:

$$E(\mathcal{P})=\omega_{col}E_{col}(\mathcal{P})+\omega_{lan}E_{lan}(\mathcal{P})+\omega_{reg}E_{reg}(\mathcal{P})$$

where $\omega_{col}E_{col}(\mathcal{P})+\omega_{lan}E_{lan}(\mathcal{P})$ is the data term and $\omega_{reg}E_{reg}(\mathcal{P})$ is the prior term.

The data term measures the similarity between the synthesized imagery and the input data in terms of photo-consistency $E_{col}$ and facial feature alignment $E_{lan}$. The smart photography system 110 takes the likelihood of a given parameter vector $\mathcal{P}$ into account by utilizing the statistical regularizer $E_{reg}$. The weights $\omega_{col}$, $\omega_{lan}$, and $\omega_{reg}$ balance the three different sub-objectives. In some embodiments, the smart photography system 110 predefines the weights and sets each respective weight at, for example, $\omega_{col}=1$, $\omega_{lan}=10$, and $\omega_{reg}=2.5*10^{-5}$.

To quantify how well the input data is explained by a synthesized image, the smart photography system 110 measures the photo-metric alignment error on pixel level:

$$E_{col}(\mathcal{P}) = \frac{1}{|\mathcal{V}|}\sum_{p\in\mathcal{V}}\|\mathcal{C}_S(p) - \mathcal{C}_I(p)\|_2$$

where $\mathcal{C}_S$ is the synthesized image, $\mathcal{C}_S$ is the input RGB image, and $\mathcal{P} \in \mathcal{V}$ denote all visible pixel positions in $\mathcal{C}_S$.

The smart photography system 110 uses an $\ell_{2,1}$-norm to be robust against outliers. In particular, distance in color space is based on $\ell_2$, while the smart photography system 110 uses an $\ell_1$-norm in the summation over the all pixels.

In other embodiments, however, the smart photography system 110 may use a least-squares formulation.

In addition, the smart photography system 110 enforces feature similarity between a set of salient points pairs (e.g., taken from the salient points 308) detected in the RGB stream:

$$E_{lan}(\mathcal{P}) = \tfrac{1}{|\mathcal{F}|}\sum_{f_j \in \mathcal{F}} \omega_{conf,j} \|f_j - \Pi(\Phi(v_j))\|_2^2$$

To this end, the smart photography system 110 employs a facial landmark tracking algorithm. In particular, the smart photography system 110 can implement the facial landmark tracking algorithm set forth in Jason M. Saragih, Simon Lucey, and Jeffrey F. Cohn, *Deformable model fitting by regularized landmark mean-shift*, International Journal of Computer Vision 91.2 200-215 (2011), which is incorporated herein by reference in its entirety. Based on this facial landmark tracking technique, each feature point $f_j \in \mathcal{F} \subset \mathbb{R}^2$ comes with a detection confidence $\omega_{conf,j}$ and corresponds to a unique vertex $v_j = \mathcal{M}_{geo}(\alpha, \delta) \in \mathbb{R}^3$ of the face prior. Thus, the smart photography system 110 avoids issues with local minima in the highly-complex energy landscape of $E_{col}(\mathcal{P})$.

The smart photography system 110 further enforces plausibility of the synthesized faces based on the assumption of a normal distributed population. In particular, the smart photography system 110 enforces the parameters to stay statistically close to the mean:

$$E_{reg}(\mathcal{P}) = \sum_{i=1}^{80}\left[\left(\frac{\alpha_i}{\sigma_{id,i}}\right)^2 + \left(\frac{\beta_i}{\sigma_{alb,i}}\right)^2\right] + \sum_{i=1}^{76}\left(\frac{\delta_i}{\sigma_{exp,i}}\right)^2.$$

By using this regularization strategy, the smart photography system 110 prevents degeneration of the facial geometry and reflectance, and also guides the optimization strategy out of the local minima.

As described, and as illustrated in FIG. 3, the smart photography system 110 generates the face mesh 306 based on the morphable model 304 and further based on analyzing the face 302 to identify salient points 308. Although the above description with reference to FIG. 3 includes various equations and formulas, in some embodiments the smart photography system 110 can implement one or more of the techniques and processes described in Justus Thies, Michael Zollhofer, Marc Stamminger, Christian Theobalt, and Matthias Nießner, *Face2face: Real-time face capture and reenactment of rgb videos*, Proceedings of the IEEE Conference on Computer Vision and Pattern Recognition, 2387-2395 (2016), which is incorporated herein by reference in its entirety.

Figure 4:
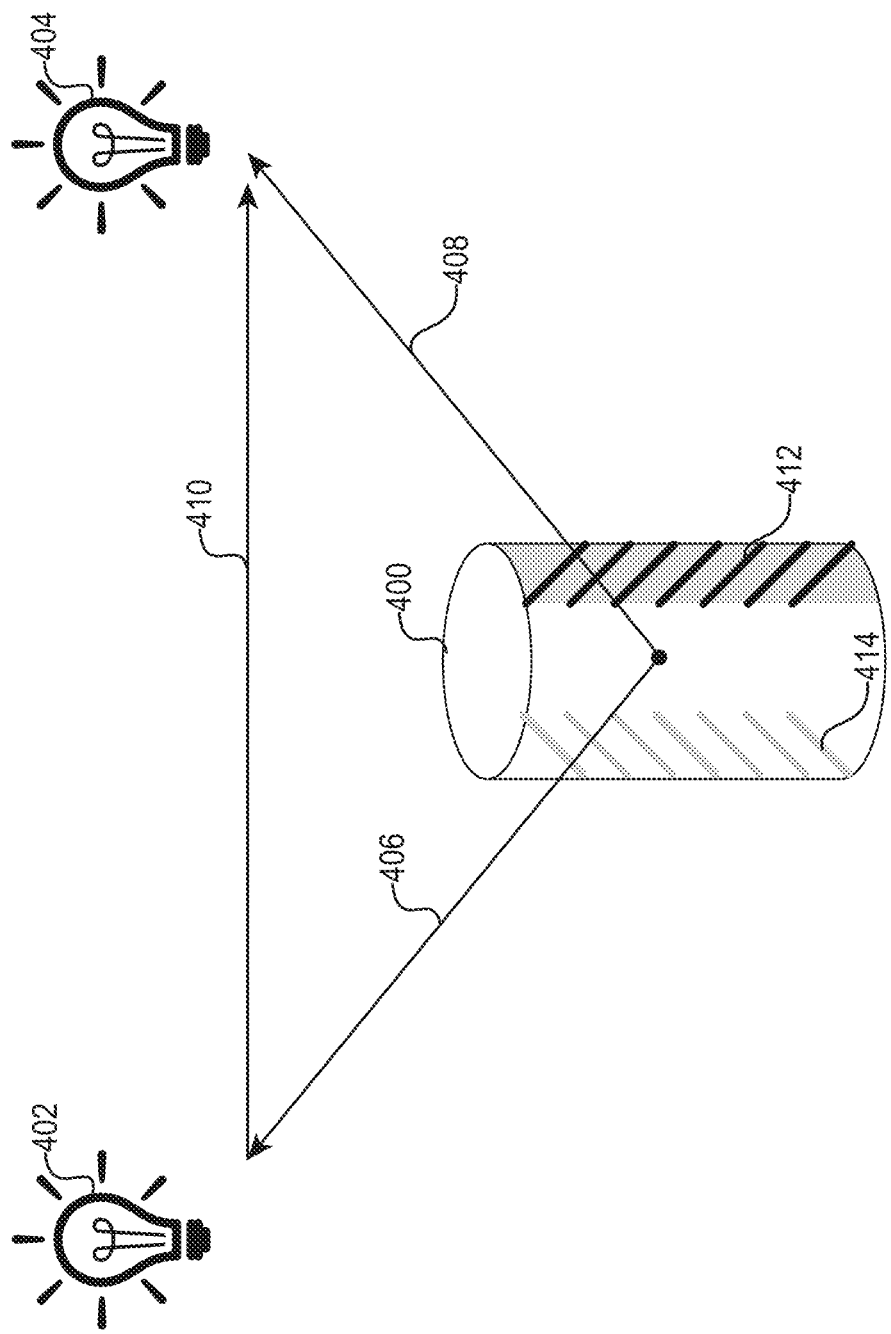
FIG. 4 illustrates an example analysis of lighting of a digital image or camera feed in accordance with one or more embodiments.

As mentioned, the smart photography system 110 can further determine a number and location of light sources that illuminate the camera feed 202. To illustrate the process of determining light source locations, FIG. 4 shows an object 400, a light source 402 that causes the shading 412, and a target light source 404 that causes the shading 414. For illustrative purposes, the discussion of FIG. 4 relates to the object 400, the light source 402, and the target light source 404. However, the description of FIG. 4 relates to the above discussion in relation to the camera feed 202 and the target image model 210.

In particular, the light source 402 is analogous to a detected light source that illuminates the camera feed 202 described above. Thus, the shading 412 is analogous to the camera feed shading overlay 208 described above. Likewise, the target light source 404 is analogous to the light source associated with the target image model 210, and the target shading 414 is analogous to the target shading overlay 212, also described above. Accordingly, FIG. 4 illustrates an example environment in which the smart photography system 110 can analyze the illumination of the object 400 to determine lighting vectors and thereby determine any adjustments necessary to align the light source 402 with the target light source 404.

Indeed, as shown in FIG. 4, the smart photography system 110 detects a light source 402 that illuminates the object 400, thereby causing the shading 412. More specifically, the smart photography system 110 can determine a light source vector 406 that indicates a direction of the light source 402. Additionally, the smart photography system 110 accesses known (e.g., predetermined) parameters including a location of a target light source 404 that causes a target shading 414. Indeed, the smart photography system 110 can analyze a target image with a target light source 404 to generate the known parameters. Thus, the smart photography system 110 accesses a target light source vector 408 that indicates a direction and/or distance of the target light source 404.

Accordingly, based on the light source vector 406 and the target light source vector 408, the smart photography system 110 determines a difference between the location of the light source 402 and the target light source 404. To determine this difference, the smart photography system 110 can calculate a correction vector 410 that indicates a direction and distance required to move the light source 402 to match the location of the target light source 404.

In particular, the smart photography system 110 implements, for the light source 402 as well as the target light source 404, a lighting detection model suited for natural scene illumination. The smart photography system 110 combines both depth and intensity cues of the camera feed 202 (e.g., as captured as RGB-D data by the camera of the user client device 106). The lighting model accounts for light sources, multiple albedos, and local lighting effects such as specularities, shadows, and inter-reflections.

To illustrate, the smart photography system 110 implements a shading function that relates a surface geometry to its intensity image. The smart photography system 110 analyzes the image under natural illumination where there is no single point light source. In particular, the smart photography system 110 employs an extended intrinsic image decomposition model for recovery intrinsic images. The smart photography system 110 can efficiently incorporate this model to generate a surface reconstruction:

$$L(i,j,\vec{n}) = \rho(i,j) S(\vec{n}) + \beta(i,j)$$

where $L(i, j, \vec{n})$ is the image lighting at each pixel, $S(\vec{n})$ is the shading, $\rho(i, j)$ accounts for multiple scene albedos and shadowed areas by adjusting the shading intensity. In addition, $\beta(i, j)$ is an independent, spatially changing, near light source that accounts for local lighting variations such as inter-reflections and specularities. As used hereafter, the (i, j) indexing nomenclature is sometimes omitted for convenience and ease of interpretation.

Initially, the smart photography system 110 assumes a Lambertian scene to recovery the shading S associated with light sources that have a uniform effect on a given image (e.g., the camera feed 202 and/or the target image model 210). Once the smart photography system 110 computes the shading, the smart photography system 110 finds ρ and β to better explain the intensity image based on the object geometry. In some embodiments, the smart photography system 110 sets ρ=1 and β=0 during the shading recovery process.

Generally, the irradiance of diffuse objects in natural illumination scenes can be well described by low order spherical harmonics components. Thus, the smart photography system 110 implements a smooth function to recover the shading image. For efficiency and simplicity, the smart photography system 110 uses zero and first order spherical harmonics which are a linear polynomial of a surface normals and are independent of a given pixel's location. Therefore, they can be represented by:

$$S(\vec{n}) = \vec{m}^T \tilde{n}$$

where $\vec{n}$ is the surface normal, $S(\vec{n})$ is the shading function, $\vec{m}$ is a vector of the four first order spherical harmonics coefficients, and $\tilde{n} = (\vec{n}, 1)^T$.

Every valid pixel in the aligned intensity image I can be used to recover the shading. Hence, the smart photography system 110 generates an over-determined least squares parameter estimation problem:

$$\operatorname{argmin}_{\vec{m}} = \|\vec{m}^T \tilde{n} - I\|_2^2.$$

The rough normals that the smart photography system 110 obtains from the initial depth map eliminate the need for assumptions and constraints on the shape as well as the need for using several images. Thus, despite having only the normals of the smoothed surface, the smart photography system 110 can still obtain an accurate shading model. In addition, the estimated surface normals eliminate the need for pre-calibrating the system lighting, thereby enabling the smart photography system 110 to function in dynamic lighting environments.

The shading alone provides only a rough assessment overall lighting. To account for specularities, shadows, and nearby light sources, the smart photography system 110 further calculates ρ and β. Indeed, based on the determination of S (described above), the smart photography system 110 can then recover ρ.

To recover ρ, the smart photography system 110 freezes S to the shading image and optimizes ρ to distinguish between the scene albedos, and to account for shadows (β is still set to 0, as its recovery is described below). The smart photography system 110 sets a fidelity term to minimize the $\ell$ error between the proposed model (e.g., the target image model 210) and the input image (e.g., the camera feed 202). However, to avoid over-fitting, the smart photography system 110 utilizes a prior term that prevents p from changing too rapidly. Thus, the smart photography system 110 implements a model that explains only lighting changes and not geometry changes.

Following the retinex theory and other similar intrinsic image recovery algorithms, the smart photography system 110 assumes that the albedo map is piecewise smooth and that there is a low number of albedos in the image. Furthermore, the smart photography system 110 utilizes a weighted Laplacian to distinguish between materials and albedos on a scene, while also maintaining a smooth-changing nature of light. The penalty term for doing so may be represented as:

$$\left\| \sum_{k \in \mathcal{N}} \omega_k^c \omega_k^d (\rho - \rho_k) \right\|_2^2$$

where $\mathcal{N}$ is the neighborhood of the pixel, $\omega_k^c$ is an intensity weighting term:

$$\omega_k^c = \begin{cases} 0, & \|I_k - I\|_2^2 > \tau \\ \exp\left(-\frac{\|I_k - I(i,j)\|_2^2}{2\sigma_c^2}\right), & \text{otherwise} \end{cases}$$

and $\omega_k^d$ is the following depth weighting term:

$$\omega_k^d = \exp\left(-\frac{\|z_k - z(i,j)\|_2^2}{2\sigma_d^2}\right)$$

where $\sigma_d$ is a parameter responsible for the allowed depth discontinuity and $z(i, j)$ represents the depth value of the respective pixel.

Using this regularization term, the smart photography system 110 performs a three-dimensional segmentation of a scene (e.g., a scene depicted by the camera feed 202), dividing into piecewise smooth parts. Therefore, the smart photography system 110 accounts for material and albedo changes, but smart photography system 110 smooths subtle changes in the surface. In sum, the smart photography system 110 generates to following regularized linear least squares problem with respect to ρ:

$$\min_\rho \left\| \rho S(\vec{n}) - I \right\|_2^2 + \lambda_\rho \left\| \sum_{k \in \mathcal{N}} \omega_k^c \omega_k^d (\rho - \rho_k) \right\|_2^2.$$

As mentioned above, after the smart photography system 110 calculates p, the smart photography system 110 then calculates β. The smart photography system 110 can implement a similar recovery process for β as the smart photography system 110 uses for ρ. However, since first order spherical harmonics account for approximately 87.5% of scene lighting, the smart photography system 110 also limits the energy of β to be consistent with the shading model. Thus, the smart photography system 110 determines β by:

$$\min_\beta \left\| \beta - (I - \rho S(\vec{n})) \right\|_2^2 + \lambda_\beta^1 \left\| \sum_{k \in \mathcal{N}} \omega_k^c \omega_k^d (\beta - \beta_k) \right\|_2^2 + \lambda_\beta^2 \|\beta\|_2^2.$$

Accordingly, the smart photography system 110 generates a lighting estimation model for the camera feed 202 and/or the target image model 210. Based on generating both a lighting model for the camera feed 202 and the target image model 210, the smart photography system 110 can determine a difference between lighting locations of the camera feed 202 and the target image model 210. Thus, the smart photography system 110 can generate a guide to correct the differences and align the lighting attributes of the camera feed 202 with the lighting attributes of the target image model 210.

Although the above description with reference to FIG. 4 includes various equations and formulas for estimating light source locations, in some embodiments the smart photography system 110 can implement one or more of the techniques and processes described in Roy Or-El, Guy Rosman, Aaron Wetzler, Ron Kimmel, and Alfred M. Bruckstein, RGBD-fusion: Real-time high precision depth recovery, Proceedings of the IEEE Conference on Computer Vision and Pattern, Recognition, 5407-5416 (2015), which is incorporated herein by reference in its entirety.

Figure 5:
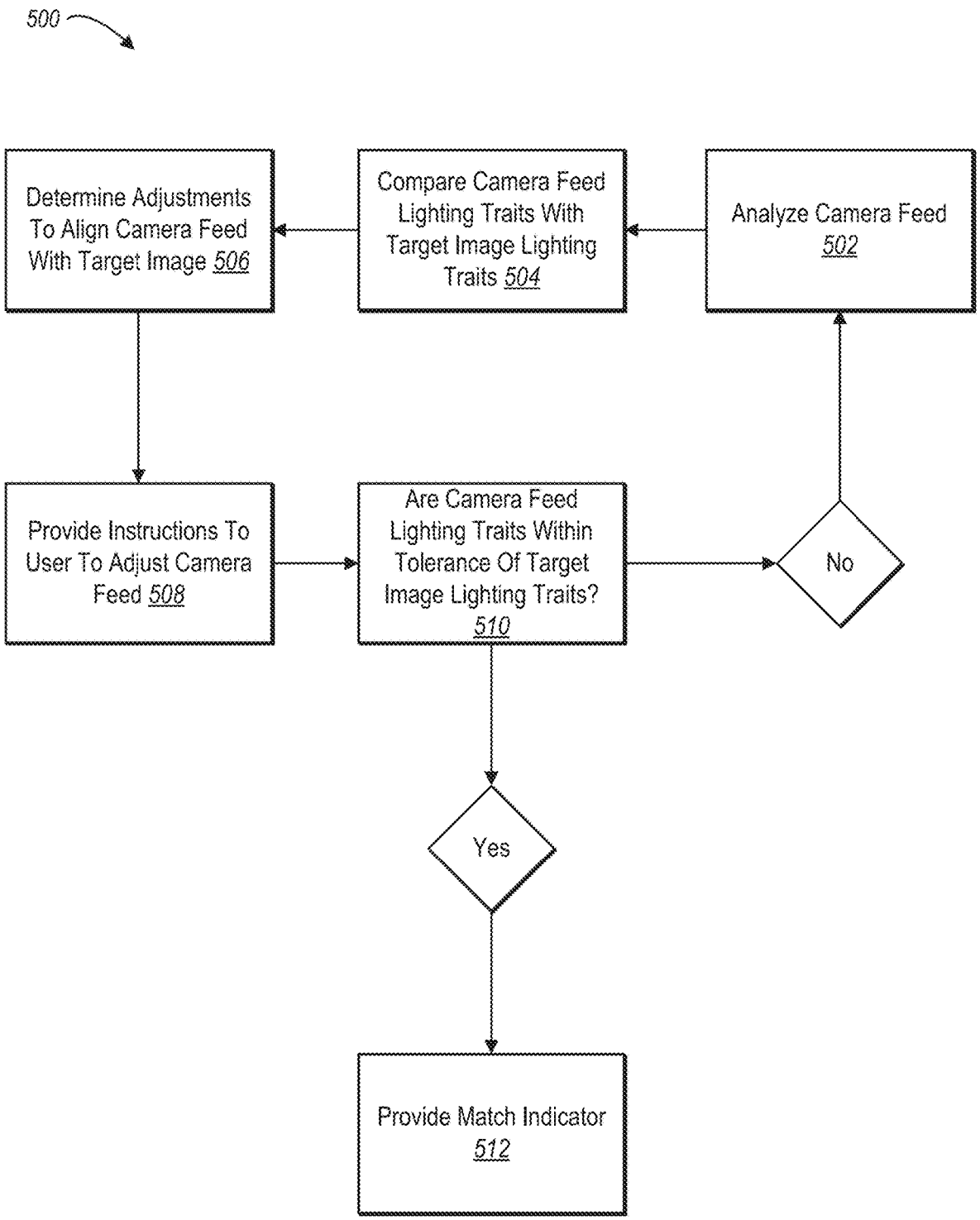
FIG. 5 illustrates an example flow of a step for providing a guide to instruct a user to align image attributes of a camera feed with image attributes of a target image model in accordance with one or more embodiments.

As mentioned above, the smart photography system 110 provides a guide to instruct a user (e.g., user 112) to align a camera feed (e.g., camera feed 202) with a target image model (e.g., target image model 210). Indeed, FIG. 5 illustrates a step for providing a guide to instruct a user associated with a user client device to align image attributes of a camera feed with target image attributes of a target image model. The step for providing a guide to instruct a user associated with a user client device to align image attributes of a camera feed with target image attributes of a target image model can include the below description of FIG. 5, in addition to relevant methods and techniques described elsewhere in this disclosure, including but not limited to, the equations and formulas described in relation to FIGS. 3 and 4.

FIG. 5 illustrates a flow 500 that includes a number of acts 502-512 included in the above-mentioned step for providing a guide to instruct a user associated with a user client device to align image attributes of a camera feed with target image attributes of a target image model. In particular the flow 500 includes an act 502 whereby the smart photography system 110 analyzes a camera feed. For example, the smart photography system 110 analyzes the camera feed by implementing the algorithms and processes described above to determine camera feed lighting attributes and target image lighting attributes. Additional detail regarding the camera feed lighting attributes and the target image lighting attributes is provided above.

Based on the analysis of the camera feed, the smart photography system 110 further performs act 504 to compare camera feed lighting attributes with the target image lighting attributes. Indeed, the smart photography system 110 compares the image lighting attributes by determining a difference in lighting position between the camera feed and the target image model. The smart photography system 110 further determines a difference in face position and orientation between the camera feed and the target image model. Additional detail regarding these determinations is provided above in relation to previous figures.

As shown, the smart photography system 110 further performs act 506 to determine adjustments to align the camera feed with the target image model. In particular, the smart photography system 110 calculates a correction vector necessary to align the light source location(s) of the camera feed with the light source location(s) of the target image model. In addition, the smart photography system 110 determines a number of pixels and/or degrees that a user needs to move a face shown within the camera feed to match the position and orientation of the face shown within the target image model.

As further illustrated in FIG. 5, the smart photography system 110 performs act 508 to provide instructions to the user to adjust the camera feed. In particular, the smart photography system 110 displays a lighting direction indicator to guide the user to adjust the light source location to align the light source location of the camera feed with that of the target image model. Further, the smart photography system 110 provides a face direction indicator to guide the user to move the position and/or orientation of the face shown within the camera feed. As mentioned above, the smart photography system 110 may further (or alternatively) provide a camera direction indicator to guide the user to move the camera of the user client device to align the image lighting features of the camera feed with those of the target image model. Additional detail regarding the lighting direction indicator, the face direction indicator, and the camera direction indicator is provided above.

FIG. 5 further illustrates act 510 whereby the smart photography system 110 determines whether the camera feed lighting attributes are within a tolerance of the target image lighting attributes. As described above, the smart photography system 110 determines whether the face shown within the camera feed is oriented within a threshold number of degrees in a vertical direction and a horizontal direction of the face within the target image model. The smart photography system 110 further determines whether the light location of the camera feed (and therefore the shading of the camera feed) is within a threshold number of degrees of the light location of the target image model. The smart photography system 110 can further determine whether the shading on the face in camera feed is within a threshold pixel area or threshold percentage of the shading on the face within the target image model.

In response to determining that the camera feed lighting attributes are within a tolerance of the target image lighting attributes, the smart photography system 110 performs act 512 to provide a match indicator. In particular, the smart photography system 110 provides an indication to the user that the camera feed is sufficiently aligned with the target image model. As described above, the indication can include a text-based indication, a change in overlay colors, an audio indicator, and/or a haptic indicator.

In response to determining that the camera feed lighting attributes are not within a tolerance of the target image lighting attributes, on the other hand, the smart photography system 110 repeats acts 502 through 510. Indeed, the smart photography system 110 can continuously repeat acts 502-510 numerous times over as the camera feed refreshes (e.g., once per frame, once per three frames, once per five frames, etc.) to constantly analyze the camera feed to detect when the camera feed aligns with the target image model to satisfy act 510.

Figure 6:
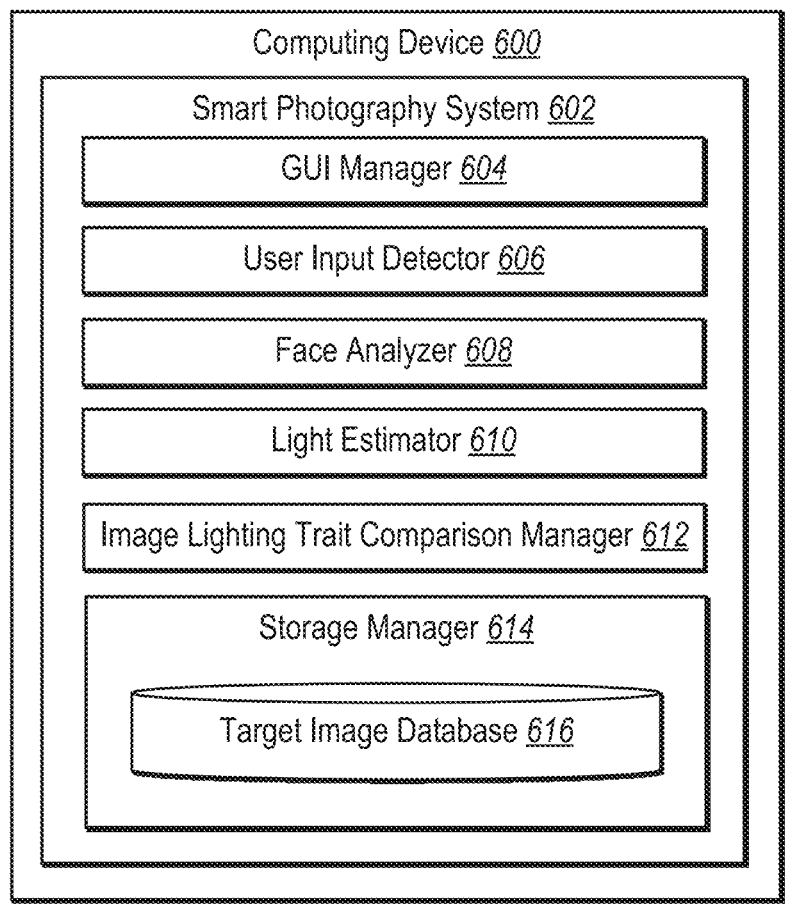
FIG. 6 illustrates an example block diagram of the smart photography system in accordance with one or more embodiments.

Looking now to FIG. 6, additional detail will be provided regarding components and capabilities of a smart photography system 602. The smart photography system 602 of FIG. 6 may be the same as the smart photography system 110 of FIG. 1. Specifically, FIG. 6 illustrates an example schematic diagram of the smart photography system 110 on an example computing device 600 (e.g., the server(s) 104 and/or the user client device 106, a drone, a camera, a smart phone). As shown in FIG. 6, the smart photography system 110 may include a GUI manager 604, a user input detector 606, a face analyzer 608, a light estimator 610, an image lighting attribute comparison manager 612, and a storage manager 614. While FIG. 6 depicts a particular number of components, in some embodiments, the smart photography system 110 may include more or fewer components. In addition, the components may perform additional or alternative tasks than those described hereafter.

As mentioned, the smart photography system 602 includes a GUI manager 604. The GUI manager 604 may present, display, provide, or otherwise manage a GUI associated with the smart photography system 602. For example, the GUI manager 604 can present a GUI that includes a camera feed, a target image model, a lighting direction indicator, a face direction indicator, a camera direction indicator, a user action button 213, and/or other elements. To illustrate, the GUI manager 604 can communicate with an image capturing device (e.g., a camera) associated with the computing device 600 to display a captured camera feed. The GUI manager 604 can also present detailed instructions (e.g., text) as well as any visible indicators described above (e.g., the match indicator).

As also mentioned, the smart photography system 602 includes a user input detector 606. In particular, the user input detector 606 can receive or detect any input or user interaction with the computing device 600. For example, the user input detector 606 can detect user input by way of a touchscreen or some other input interface by which a user can provide user input to interact with a GUI of the smart photography system 602. In response to detecting user input in relation to a particular element of the GUI, the user input detector 606 can further communicate with the face analyzer 608, the image lighting attribute comparison manager 612, the GUI manager 604, and/or some other component of the smart photography system 602 to cause performance of one or more of the processes described above.

As shown, the smart photography system 602 includes a face analyzer 608. In particular, the face analyzer 608 can analyze a face within a camera feed and/or a target image model to identify or detect facial contours and landmarks. For example, the face analyzer 608 can implement the processes and algorithms described above, and can communicate with the image lighting attribute comparison manager 612 to determine differences (e.g., differences in position and/or orientation) between a face within the camera feed and a face within the target image model. Based on any determined differences, the face analyzer 608 can communicate with the GUI manager 604 to present GUI elements to guide a user to align the camera feed with the target image model.

As illustrated in FIG. 6, the smart photography system 602 further includes a light estimator 610. In particular, the light estimator 610 can analyze a camera feed and/or a target image model to determine lighting attributes associated with the camera feed and/or the target image model. For example, the light estimator 610 can implement the lighting attribute algorithms described above. In addition, the light estimator 610 can communicate with the image lighting attribute comparison manager 612 to compare the lighting attributes associated with the camera feed with the lighting attributes associated with the target image model.

Indeed, the image lighting attribute comparison manager 612 can compare the lighting attributes associated with the camera feed with the lighting attributes associated with a target image model. Indeed, the image lighting attribute comparison manager 612 can compare face position, face orientation, light source position, etc. Based on the comparison, the image lighting attribute comparison manager 612 can communicate with the GUI manager 604 to provide instructions to guide a user to align the lighting attributes of the camera feed with the lighting attributes of the target image model.

As also illustrated in FIG. 6, the smart photography system 602 includes a storage manager 614. In particular, the storage manager 614 can include a target image database 616 and can store, maintain, or otherwise manage target image models. For example, the target image database 616 can include a number of target image models to include within a selector gallery, as described above. The target image database 616 can further store image lighting attributes associated with each stored target image model. Thus, the storage manager 614 can communicate with the image lighting attribute comparison manager 612 to compare the stored image lighting attributes of a selected target image model with the determined image lighting attributes of a camera feed.

FIGS. 1-6, the corresponding text, and the examples provide a number of different systems and methods that analyze a camera feed to determine image lighting attributes and compare the determined image lighting attributes with corresponding image lighting attributes associated with the target image model to generate and provide instructions to guide a user to align the camera feed with the target image model. In addition to the foregoing, embodiments can also be described in terms of flowcharts comprising acts for accomplishing a particular result. For example, FIG. 7 illustrates a flowchart of an exemplary series of acts in accordance with one or more embodiments.

Figure 7:
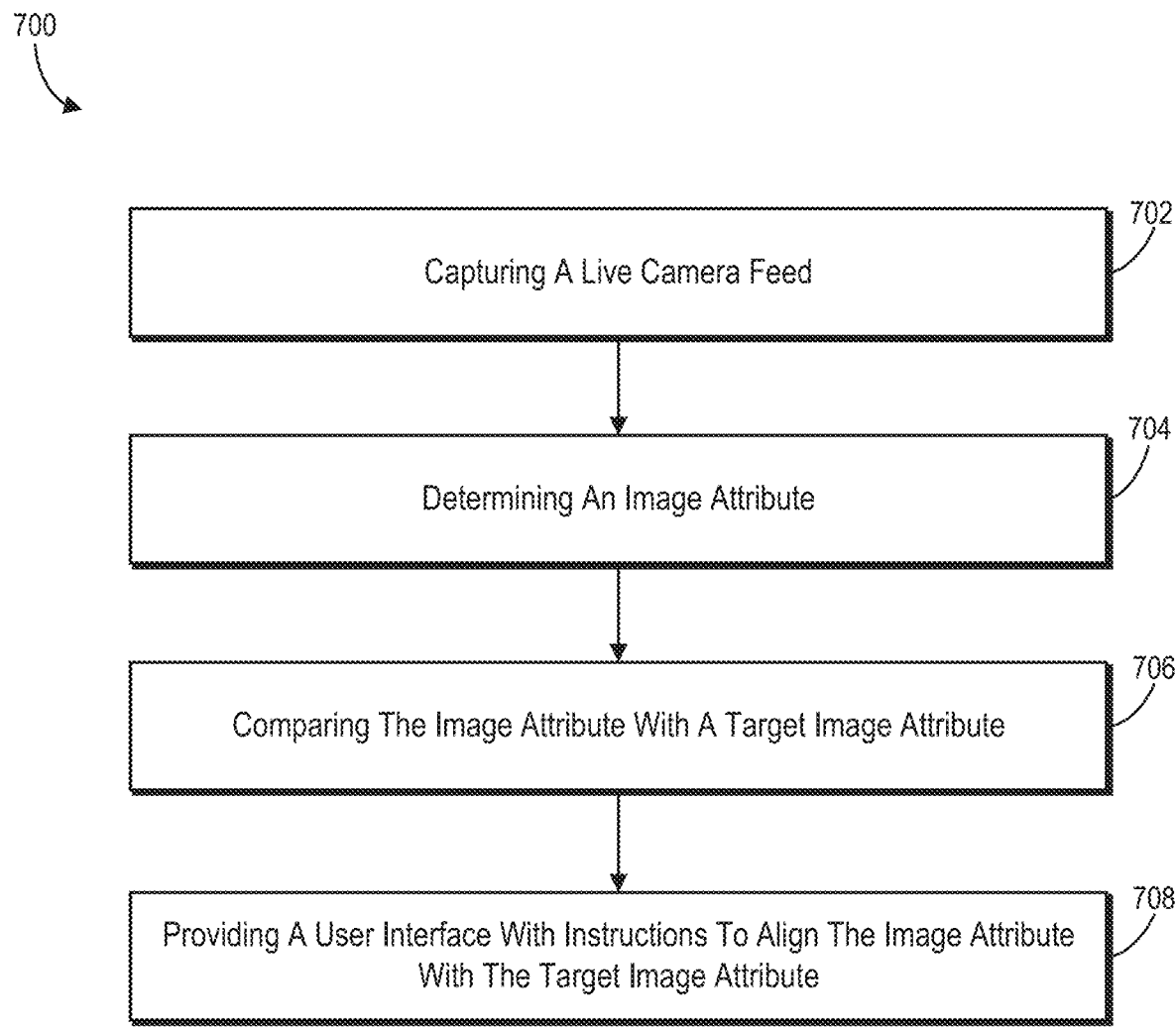
FIG. 7 illustrates a flowchart of a series of acts for guiding a user to align a camera feed with a target image model in accordance with one or more embodiments.

While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7. Additionally, the steps/acts described herein may be repeated or performed in parallel with one another or in parallel with different instances of the same or other similar steps/acts.

FIG. 7 illustrates an exemplary series of acts 700 for guiding a user to align a camera feed with a target image model. In particular, the series of acts 700 includes an act 702 of capturing a live camera feed. For example, the act 702 can involve capturing a live camera feed via a computing device.

As shown, the series of acts 700 includes an act 704 of determining an image attribute. In particular, the act 704 can involve determining an image attribute of the camera feed. Although not illustrated in FIG. 7, the series of acts 700 can further include an act of generating, based on the camera feed, a three-dimensional mesh of a face depicted within the camera feed, wherein the three-dimensional mesh includes a mapping of the face depicted within the camera feed. Thus, the act 704 can further involve determining, based on the camera feed, a location of a light source that illuminates the camera feed and determining, based on the three-dimensional mesh, a face position of the face depicted within the camera feed.

Determining the location of the light source that illuminates the camera feed can include calculating a normalized lighting vector for the light source that illuminates the camera feed. In addition, comparing the image attribute of the camera feed with the target image attribute of the target image model can include determining a difference between the normalized lighting vector and a predefined normalized target lighting vector associated with the target image model.

As further shown in FIG. 7, the series of acts 700 includes an act 706 of comparing the image attribute with a target image attribute. In particular, the act can involve comparing the image attribute of the camera feed with a target image attribute of a target image model. The target image attribute of the target image model can include one or more of a target head position, a target light source location, or a target camera position.

In addition, the series of acts 700 includes an act 708 of providing a user interface with instructions to align the image attribute with the target image attribute. In particular, the act 708 can involve, based on the comparison, providing, by way of a user interface on the computing device, a guide with interactive, real-time instructions on how to align the image attribute of the camera feed with the target image attribute of the target image model. The act 708 can further involve displaying a target shading indicator that indicates shading within the target image model and a camera feed shading indicator that indicates shading within the camera feed. Displaying the target shading indicator can include displaying a target shade overlay on the camera feed to indicate a target shading associated with the target image model. Additionally, or alternatively, displaying the target shading indicator can include providing a rendering of the target image model that comprises a target shade texture that indicates target shading associated with the target image model.

In addition, the act 708 can involve providing, to the user by way of the user client device, instructions on how to manipulate the camera feed to align the camera feed shading indicator with the target shading indicator. Displaying the camera feed shading indicator can include displaying a camera feed shade overlay on the camera feed to indicate a current shading of the camera feed. Additionally, or alternatively, displaying the camera feed shading indicator can include overlaying a camera feed shade texture on the camera feed to indicate a current shading of the camera feed. The instructions on how to manipulate the camera feed can include one or more of a face direction indicator that indicates a direction to move a face depicted within the camera feed or a lighting direction indicator that indicates a direction to move a light source that illuminates the camera feed.

Though not illustrated in FIG. 7, the series of acts 700 can include an act of determining that the image attribute associated with the camera feed is within a tolerance of the target image attribute of the target image model. The series of acts can also include an act of providing, by way of the user client device and in response to determining that the image attribute of the camera feed is within the tolerance of the target image attribute of the target image model, an alignment indicator that indicates an alignment of the camera feed with respect to the target image model.

Furthermore, the series of acts 700 can include an act of providing, by way of the user interface on the user client device, a plurality of target image models as well as an act of receiving a user input to select a target image model from among the plurality of target image models. The series of acts 700 can further include an act of displaying, by way of the user client device, a detailed instruction element, and an act of, in response to detecting a user selection of the detailed instruction element, providing detailed instructions to the user on how to align the camera feed with the target image model.

The series of acts 700 can also include an act of, in response to detecting that the camera feed shading indicator is within an alignment tolerance of the target shading indicator, providing a match indicator to alert the user that the camera feed is aligned with the target image model.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
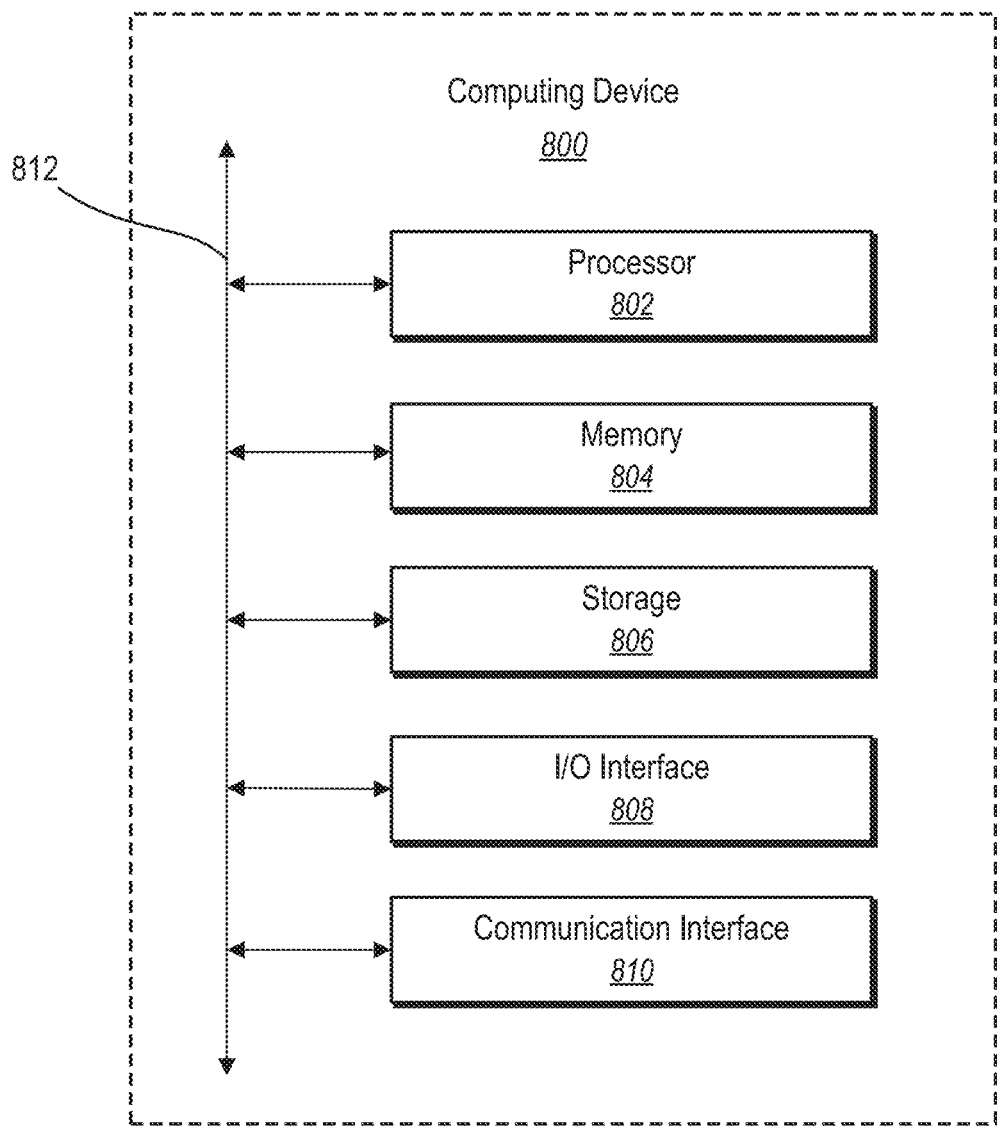
FIG. 8 illustrates a block diagram of an example computing device in accordance with one or more embodiments.

FIG. 8 illustrates, in block diagram form, an exemplary computing device 800 that may be configured to perform one or more of the processes described above. One will appreciate that the smart photography system 110 can comprise implementations of the computing device 800. As shown by FIG. 8, the computing device can comprise a processor 802, memory 804, a storage device 806, an I/O interface 808, and a communication interface 810. Furthermore, the computing device 800 can include a camera and a display screen. In certain embodiments, the computing device 800 can include fewer or more components than those shown in FIG. 8. Components of computing device 800 shown in FIG. 8 will now be described in additional detail.

In particular embodiments, processor(s) 802 includes hardware for executing instructions, such as those making up a computer program. As an example, and not by way of limitation, to execute instructions, processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, storage device 806 can comprise a non-transitory storage medium described above. The storage device 806 may include a hard disk drive (HDD), flash memory, a Universal Serial Bus (USB) drive or a combination of these or other storage devices.

The computing device 800 also includes one or more input or output ("I/O") devices/interfaces 808, which are provided to allow a user to provide input to (such as user strokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a writing device or a finger.

The I/O devices/interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can comprise hardware, software, or both that couples components of computing device 800 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium for guiding uses users to capture digital images that match target image attributes comprising instructions that, when executed by at least one processor, cause a computing device to:
provide a plurality of selectable target image models for display together with a camera feed within a user interface on the computing device;
receive a user input via the user interface indicating selected target image model from the plurality of selectable target image models displayed within the user interface;
determine an image attribute of the camera feed being captured by the computing device;
compare the image attribute with a target image attribute of the selected target image model; and
based on the comparison, provide, over the camera feed, a graphical user interface element indicating an instruction for aligning the image attribute with the target image attribute.

2. The non-transitory computer readable medium of claim 1, wherein the instructions, when executed by the at least one processor, cause the computing device to provide the plurality of selectable target image models indicating different image attributes within a selector gallery over the camera feed.

3. The non-transitory computer readable medium of claim 1, further comprising instructions that, when executed by the at least one processor, cause the computing device to provide an indication of the selected target image model via the user interface.

4. The non-transitory computer readable medium of claim 1, further comprising instructions that, when executed by the at least one processor, cause the computing device to provide an overlay representative of the selected target image model over the camera feed in response to the user input indicating the selected target image model.

5. The non-transitory computer readable medium of claim 4, wherein the instructions, when executed by the at least one processor, cause the computing device to provide the overlay representative of the selected target image model by providing a shading overlay on a face being captured by the camera feed.

6. The non-transitory computer readable medium of claim 1, wherein the instructions, when executed by the at least one processor, cause the computing device to provide the graphical user interface element indicating the instruction for aligning the image attribute with the target image attribute by providing a textual graphical user interface element comprising a detailed instruction on how to move one or more of the computing device, a subject being captured in the camera feed, or a light source illuminating one or more objects being captured by the camera feed.

7. The non-transitory computer readable medium of claim 1, further comprising instructions that, when executed by the at least one processor, cause the computing device to:
determine that the image attribute of the camera feed is within a tolerance of the target image attribute of the selected target image model; and
provide, via the user interface and in response to determining that the image attribute of the camera feed is within the tolerance of the target image attribute of the selected target image model, an alignment indicator that indicates an alignment of the camera feed with respect to the selected target image model.

8. The non-transitory computer readable medium of claim 1, wherein:
the target image attribute comprises a lighting attribute; and
the target image models comprise lighting models.

9. The non-transitory computer readable medium of claim 1, further comprising instructions that, when executed by the at least one processor, cause the computing device to generate, based on the camera feed, a three-dimensional mesh of a face depicted within the camera feed.

10. The non-transitory computer readable medium of claim 9, wherein the instructions, when executed by the at least one processor, cause the computing device to determine the image attribute of the camera feed by:
determining, based on the camera feed, a location of a light source that illuminates the camera feed; and
determining, based on the three-dimensional mesh, a face position of the face depicted within the camera feed.

11. The non-transitory computer readable medium of claim 10, wherein determining the location of the light source that illuminates the camera feed comprises calculating a normalized lighting vector for the light source that illuminates the camera feed.

12. The non-transitory computer readable medium claim 11, wherein the instructions cause the computing device to compare the image attribute of the camera feed with the target image attribute of the target image model by determining a difference between the normalized lighting vector and a predefined normalized target lighting vector associated with the target image model.

13. In a digital medium environment for capturing digital images, a system for guiding users to capture digital images that match target images, the system comprising:
a computing device comprising a camera;
at least one processor configured to cause the system to:
capture a live camera feed via the camera;
provide a plurality of selectable target image models for display together over the live camera feed within a user interface on the computing device;
receive a user input via the user interface indicating a selected target image model from the plurality of selectable target image models displayed within the user interface;
determine an image attribute of the live camera feed being captured by the camera by analyzing the camera feed;
compare the image attribute with a target image attribute of the selected target image model; and
based on the comparison, provide, over the camera feed, a graphical user interface element indicating an instruction for aligning the image attribute with the target image attribute.

14. The system of claim 13, wherein the at least one processor is configured to cause the system to provide the graphical user interface element indicating the instruction on for aligning the image attribute with the target image attribute by:
- displaying a target shading indicator that indicates shading within the target image model and a camera feed shading indicator that indicates shading within the camera feed; and
- providing, way of the user interface, instructions for manipulating the camera feed to align the camera feed shading indicator with the target shading indicator.

15. The system of claim 14, wherein:
- displaying the target shading indicator comprises displaying a target shade overlay within the camera feed to indicate a target shading relative to a current view of the camera feed; and
- displaying the camera feed shading indicator comprises displaying a camera feed shade overlay within the camera feed to compare with the target shade overlay.

16. The system of claim 14, wherein:
- displaying the target shading indicator comprises generating a rendering of the selected target image model to display within the user interface and that comprises a target shade texture that indicates target shading of the selected target image model; and
- displaying the camera feed shading indicator comprises overlaying a camera feed shade texture on the camera feed to indicate a current shading of the camera feed to compare with the rendering of the selected target image model.

17. The system of claim 14, wherein the at least one processor is further configured to cause the system to, in response to detecting that the camera feed shading indicator is within an alignment tolerance of the target shading indicator, provide a match indicator to indicating that the camera feed is aligned with the selected target image model.

18. The system of claim 13, wherein the at least one processor is configured to cause the system to provide, over the camera feed, the graphical user interface element indicating the instruction for aligning the image attribute with the target image attribute by providing, over the camera feed within the user interface, one or more of:
- a face direction indicator that indicates a direction to move a face depicted within the camera feed; or
- a lighting direction indicator that indicates a direction to move a light source that illuminates the camera feed.

19. A computer-implemented method for guiding users to capture digital images that match target images, the method comprising:
- providing a plurality of selectable target image models for display together with a camera feed within a user interface on a computing device comprising a camera;
- receiving a user input via the user interface indicating a selected target image model from the plurality of selectable target image models displayed within the user interface;
- determining an image attribute of the camera feed being captured by the computing device;
- comparing the image attribute with a target image attribute of the selected target image model; and
- based on the comparison, providing, over the camera feed, a graphical user interface element indicating an instruction for aligning the image attribute with the target image attribute.

20. The computer-implemented method of claim 19, further comprising:
- detecting that the image attribute is aligned with the target image attribute; and
- in response to detecting that the image attribute is aligned with the target image attribute, automatically capturing a digital image via the camera without user input to capture the digital image.

* * * * *